US012717969B2

(12) United States Patent
Lancioni et al.

(10) Patent No.: US 12,717,969 B2
(45) Date of Patent: Aug. 25, 2026

(54) METHODS AND APPARATUS TO TRANSLATE HASH-BASED SIGNATURE SIGNALS FOR MACHINE LEARNING APPLICATIONS

(71) Applicant: McAfee, LLC, San Jose, CA (US)

(72) Inventors: German Lancioni, San Jose, CA (US); Steve Grobman, Plano, TX (US); Jonathan King, Hillsboro, OR (US)

(73) Assignee: McAfee, LLC, San Jose, CA (US)

( * ) Notice: Subject to any disclaimer, the term of this patent is extended or adjusted under 35 U.S.C. 154(b) by 832 days.

(21) Appl. No.: 17/894,919

(22) Filed: Aug. 24, 2022

(65) Prior Publication Data

US 2024/0070326 A1 Feb. 29, 2024

(51) Int. Cl.

| | |
|---|---|
| ***G06F 21/64*** | (2013.01) |
| ***G06F 18/214*** | (2023.01) |
| ***G06F 18/22*** | (2023.01) |
| ***G06F 18/23*** | (2023.01) |
| ***G06K 9/62*** | (2022.01) |

(52) U.S. Cl.

CPC ............ *G06F 21/64* (2013.01); *G06F 18/214* (2023.01); *G06F 18/22* (2023.01); *G06F 18/23* (2023.01)

(58) Field of Classification Search

CPC .......... G06F 21/64; G06F 18/22; G06F 18/23; G06F 18/214

See application file for complete search history.

(56) References Cited

U.S. PATENT DOCUMENTS

| | | | | |
|---|---|---|---|---|
| 8,769,683 | B1 * | 7/2014 | Oliver | G06F 21/561 719/311 |
| 9,311,403 | B1 * | 4/2016 | Ioffe | G06F 16/951 |
| 9,753,964 | B1 * | 9/2017 | Marshall | G06F 18/24137 |
| 10,236,005 | B2 * | 3/2019 | Srinivasan | G10L 19/018 |
| 11,151,250 | B1 * | 10/2021 | Chang | G06F 21/565 |
| 11,507,773 | B2 * | 11/2022 | Tepper | G06F 18/254 |
| 11,580,220 | B2 * | 2/2023 | Sanzgiri | H04L 63/1441 |
| 2007/0005556 | A1 * | 1/2007 | Ganti | G06F 16/215 |
| 2013/0204905 | A1 * | 8/2013 | Ioffe | H04L 9/00 707/E17.044 |
| 2013/0332466 | A1 * | 12/2013 | Bornea | G06F 16/951 707/E17.084 |
| 2018/0300429 | A1 * | 10/2018 | Barouni Ebrahimi | G06F 16/9014 |

(Continued)

FOREIGN PATENT DOCUMENTS

| | | | | |
|---|---|---|---|---|
| CN | 110309143 B | * 10/2021 | | G06F 16/284 |

*Primary Examiner* — Jeremy S Duffield
*Assistant Examiner* — Alex D Carrasquillo
(74) *Attorney, Agent, or Firm* — Hanley, Flight & Zimmerman, LLC

(57) ABSTRACT

Methods, apparatus, systems, and articles of manufacture are disclosed to translate hash-based signature signals for machine learning applications. In one example, the apparatus includes a processor to execute instructions to determine an element count for a plurality of hash elements of a locality sensitivity hash, preserve ones of hash elements of the plurality of hash elements that satisfy an element count threshold, and produce a cluster of encoded feature vectors of the preserved ones of the hash elements. The processor further to execute instructions to determine an occurrence frequency of hash elements in the cluster and create a synthetic hash of the cluster based on a subset of the hash elements in the cluster that satisfy an occurrence frequency threshold.

23 Claims, 14 Drawing Sheets

(56) References Cited

U.S. PATENT DOCUMENTS

| | | | | |
|---|---|---|---|---|
| 2019/0171665 | A1* | 6/2019 | Navlakha | G06V 10/761 |
| 2020/0074081 | A1* | 3/2020 | Srinivasagopalan | G06F 18/23 |
| 2020/0311611 | A1* | 10/2020 | Kennedy | G06N 20/20 |
| 2020/0382281 | A1* | 12/2020 | Fletcher | G06N 7/01 |
| 2021/0019556 | A1* | 1/2021 | Ganguly | G06F 18/24137 |
| 2021/0224258 | A1* | 7/2021 | Faruquie | G06N 3/0985 |
| 2021/0304013 | A1* | 9/2021 | Zhang | G06N 5/01 |
| 2022/0138171 | A1* | 5/2022 | Pappu | G06F 16/387<br>707/722 |
| 2022/0229810 | A1* | 7/2022 | Yoon | G06F 16/313 |
| 2022/0335340 | A1* | 10/2022 | Moustafa | G06N 20/00 |
| 2022/0383157 | A1* | 12/2022 | Dema | G06N 20/10 |
| 2023/0072240 | A1* | 3/2023 | Wang | G06F 18/2415 |

* cited by examiner

| SAMPLE 1 | 1573314738 | 726410325 | 159453322 | 25974939 | **452705408** | 1873458294 | 594457737 | 912686478 |
|---|---|---|---|---|---|---|---|---|
| SAMPLE 2 | 1573314738 | 726410325 | 159453322 | 25974939 | **286606674** | 1873458294 | 594457737 | 912686478 |

FIG. 3A

| SAMPLE A: LSH | 2793460 | 24130584 | 1955933 | ... |
|---|---|---|---|---|
| SAMPLE B: LSH | 2793460 | 22130591 | 1955933 | ... |
| SAMPLE C: LSH | 2793460 | 22130591 | 3658984 | ... |

FIG. 3B

| HASH ELEMENT | 2793460 | 22130591 | 1955933 | 24130584 | 3658984 |
|---|---|---|---|---|---|
| PRESENT IN SAMPLE A | 1 | 0 | 1 | 1 | 0 |
| PRESENT IN SAMPLE B | 1 | 1 | 1 | 0 | 0 |
| PRESENT IN SAMPLE C | 1 | 1 | 0 | 0 | 1 |

FIG. 3C

| SAMPLE A FEATURE VECTOR | 2793460 | 0 | 1955933 |
|---|---|---|---|
| SAMPLE B FEATURE VECTOR | 2793460 | 22130591 | 1955933 |
| SAMPLE C FEATURE VECTOR | 2793460 | 22130591 | 0 |

FIG. 3D

| SYNTHETIC HASH | 2793460 | 22130591 | 1955933 |
|---|---|---|---|

FIG. 3E

| SAMPLE | MINHASH | | | | | | |
|---|---|---|---|---|---|---|---|
| 1 | 2793460 | 24130584 | 3658984 | 17266034 | 30266389 | 6361937 | 30551886 |
| 2 | 42544136 | 24130584 | 3658984 | 17266034 | 34121180 | 31619883 | 156154414 |
| 3 | 2793460 | 24130584 | 3658984 | 17266034 | 30266389 | 6361937 | 30551886 |
| 4 | 42544136 | 24130584 | 3658984 | 17266034 | 143287408 | 6361937 | 156154414 |
| 5 | 22813171 | 24130584 | 3658984 | 17266034 | 34121180 | 6361937 | 156154414 |
| 6 | 2793460 | 24130584 | 3658984 | 17266034 | 30266389 | 6361937 | 30551886 |
| 7 | 2793460 | 24130584 | 3658984 | 17266034 | 30266389 | 6361937 | 30551886 |
| 8 | 2793460 | 24130584 | 3658984 | 17266034 | 30266389 | 6361937 | 30551886 |

FIG. 3F

| | | |
|---|---|---|
| MINHASH [2793460, 24130584, 3658984, ...] | 97/100 = 97% MALICIOUS | WOE: -0.03 |
| MINHASH [42544136, 24130584, 3658984, ...] | 99/163 = 61% MALICIOUS | WOE: -0.39 |
| MINHASH [22813171, 24130584, 3658984, ...] | 24/25 = 96% MALICIOUS | WOE: -0.04 |

FIG. 3G

METHODS AND APPARATUS TO TRANSLATE HASH-BASED SIGNATURE SIGNALS FOR MACHINE LEARNING APPLICATIONS

FIELD OF THE DISCLOSURE

This disclosure relates generally to machine learning and, more particularly, to translating hash-based signature signals for machine-learning applications.

BACKGROUND

In recent years, cyber-security vendors have come to rely on hash-based signatures as a component of threat detection. A signature can be composed by just one hash (e.g., an entire file/sample) or a combination of many hashes (e.g., imports hash, overlay bytes hash, exports hash, header hash, etc.). A hash that refers to a particular section of the file may also be known as a fingerprint. Fingerprints are useful to identify a threat. Even other parts of an object are changed when compared to a known threat. For example, if a malicious actor creates five different variants of the same malware, then it is likely that even though the five samples will have different file hashes, the underlying sections of such samples may remain the same. If such sections are compared via the fingerprints, then the same signature (based on a fingerprint) can eventually detect all five samples.

BRIEF DESCRIPTION OF THE DRAWINGS

FIG. 3A illustrates two example hash computations of two samples from a training or testing dataset.

FIG. 3B illustrates an example of a group of three hash computations obtained from three samples from a training or testing dataset.

FIG. 3C illustrates an example of the presence of hash elements in samples from a training or testing dataset.

FIG. 3D illustrates an example of encoded feature vectors of three samples from a training or testing dataset.

FIG. 3E illustrates an example synthetic hash created from a cluster of feature vectors.

FIG. 3F illustrates an example of the results of eight locality sensitive hash computations from eight samples in a training or testing dataset.

FIG. 3G illustrates an example of the hash criteria used to determine whether to add a locality sensitive hash value to an anchor candidate list.

In general, the same reference numbers will be used throughout the drawing(s) and accompanying written description to refer to the same or like parts.

Figure 1:
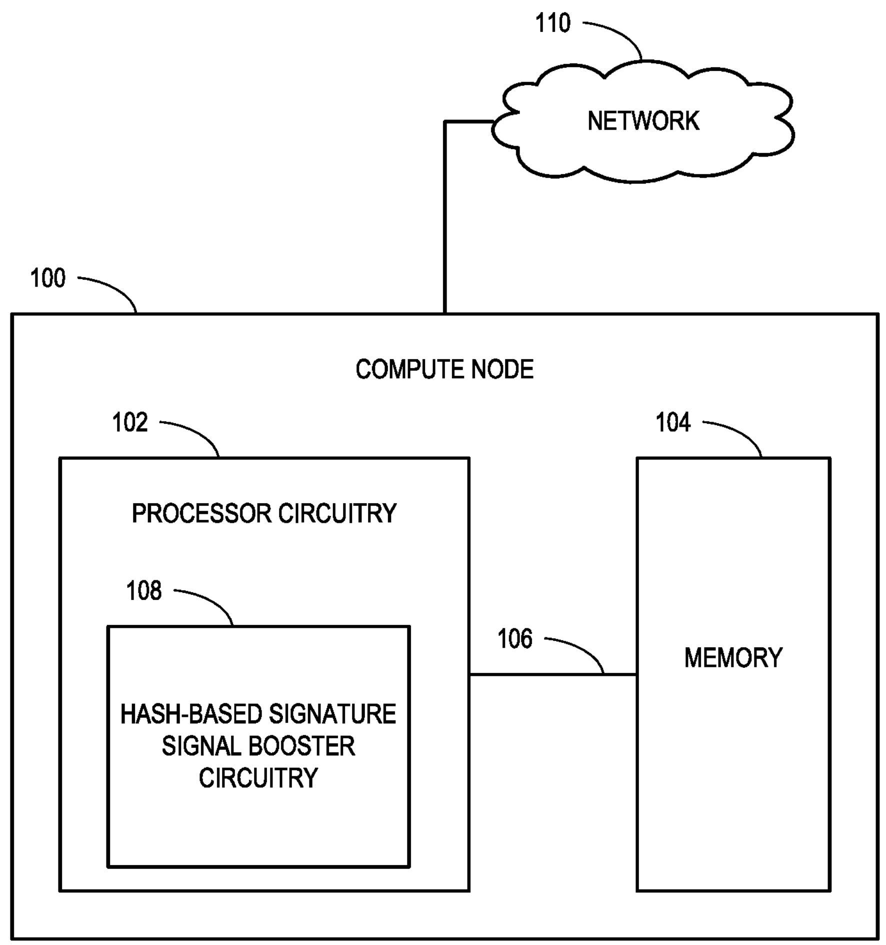
FIG. 1 is an illustration of an example compute node implementing a hash-based signature signal booster.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are suited to execute the computing task(s).

DETAILED DESCRIPTION

Cyber-security vendors often rely on hash-based signatures to perform threat detection. A signature can be composed by just 1 hash (e.g., entire file/sample) or a combination of many hashes (e.g., imports hash, overlay bytes hash, exports hash, header hash, etc.). A hash that refers to a particular section of the file may also be known as a fingerprint. Fingerprints are useful to identify more than just one sample in the world. For example, if a malicious actor creates 5 different variants of the same malware, then it is likely that even though the 5 samples will have different file hashes, the underlying sections of such samples may remain the same. If such sections are compared via the fingerprints, then the same signature can eventually detect all these 5 samples.

Cyber-security vendors have been successful when implementing hash-based signatures to perform threat detection, but such hash-based signatures also present several disadvantages: (1) smart malicious actors can introduce perturbations to produce changes at all the fingerprint levels, (2) machine learning solutions are not trainable unless transformations are applied, which are ineffective, and (3) even a 1-bit change on a file section can render the combined signature useless for detection of samples beyond the original one (i.e. polymorphic).

Most malicious code detection uses signatures (e.g., fingerprints) based on cryptographic hashes. By design, cryptographic hashes of two similar samples will not be equal. Therefore, cryptographic hashes may bear no relationship to one another and have no way of producing similarity scores even if the code samples are almost identical. Modern malicious code detection is susceptible to minor changes in the content being hashed. In a few cases where signatures/fingerprints use a non-cryptographic hash, the current method of consumption of such hashes in machine learning is via applying well-known techniques such as one-hot-encoding or feature hashing. Unfortunately, one-hot encoding and feature hashing have a dimensionality issue, where so many features are unique that a machine model is relegated to an extremely large number of features, which causes the model to underperform due to a glut of feature data. Standard dimensionality reduction is suboptimal as it includes a trade-off between performance and precision.

Examples described herein include circuitry and process as to make hash-based fingerprints flexible enough to be resilient against perturbations while at the same time enabling machine learning solutions to capitalize on the boosted signal of features derived from hash-based fingerprints. In some examples, traditional cryptographic-based hash algorithms are replaced by a locality sensitive hashing (LSH) algorithm, such as MinHash, SimHash, or another LSH algorithm. In some examples, a set of candidate LSH-based hashes are discovered to build anchor points. Using the example anchor points, a Jaccard resemblance between test samples and anchor samples can be computed. Then, in some examples, a set of candidate MinHashes are discovered and used to build anchor points. Finally, in some examples, using the anchor points, the Jaccard resemblance from test samples to the anchor samples can be computed and the resemblance scores (e.g., similarity values) can be used as features for machine learning models. For ease of explanation, the MinHash will be the LSH hashing algorithm described in examples herein, although any other LSH-based hashing algorithm may be utilized in place of MinHash in other examples.

In other examples described herein, a set of LSH-based hashes corresponding to test samples are analyzed per hash element. The hash elements that repeat across multiple hashes are preserved and encoded into feature vectors. In some examples, the feature vectors are then clustered and further analyzed to determine the more or most common and/or relevant features (using a mode or weighted mode) across vectors in the cluster. In some examples, the more or most common and/or relevant features are then used to create a synthetic hash (e.g., a synthetic LSH, a synthetic MinHash, etc.). Then, in some embodiments, the Jaccard resemblance scores of one or more created synthetic hashes and one or more test samples from a test dataset are computed and can be used as features for machine learning models.

FIG. 1 is an illustration of an example compute node implementing a hash-based signature signal booster. In the illustrated example of FIG. 1, a compute node 100 is shown. The example compute node may be a laptop computer, a desktop computer, a phone, a tablet, a workstation, a server, an embedded computing device, or any other type of computing device that can execute software code. The example compute node 100 includes processor circuitry 102, which may be the same as, similar to, different from, or complementary to processor circuitry 912 in FIG. 9. The example processor circuitry 102 includes hash-based signature signal booster circuitry 108 to translate hash-based signature signals for machine learning applications. In some examples, the processor circuitry 102 is communicatively coupled to a memory 104 over an interface. The example interface 106 includes interface circuitry to communicatively couple the processor circuitry 102 and the memory 104. The example memory 202 may include dynamic random access memory (DRAM), static random access memory (SRAM), a cache memory, a buffer, non-volatile memory, a storage device, or any one or more other forms of memory that provide data storage. The example interface 106 may include one or more types of interfaces implemented by hardware in accordance with one or more interface standards, such as IEEE (Institute of Electrical and Electronics Engineers) or JEDEC (Joint Electron Device Engineering Council) high speed memory interfaces, a Peripheral Component Interconnect Express (PCIe) interface, or any other interface capable of sending and receiving data between a processor circuitry 102 and a memory 104. The example compute node 100 is additionally communicatively coupled to a network 110. The example network 110 may be any type of network capable of carrying one or more types of network packets between nodes on the network 110, such as compute node 100 and or any one or more other compute nodes, switches, gateways, servers, edge devices, or other end points across the network 110.

Figure 2:
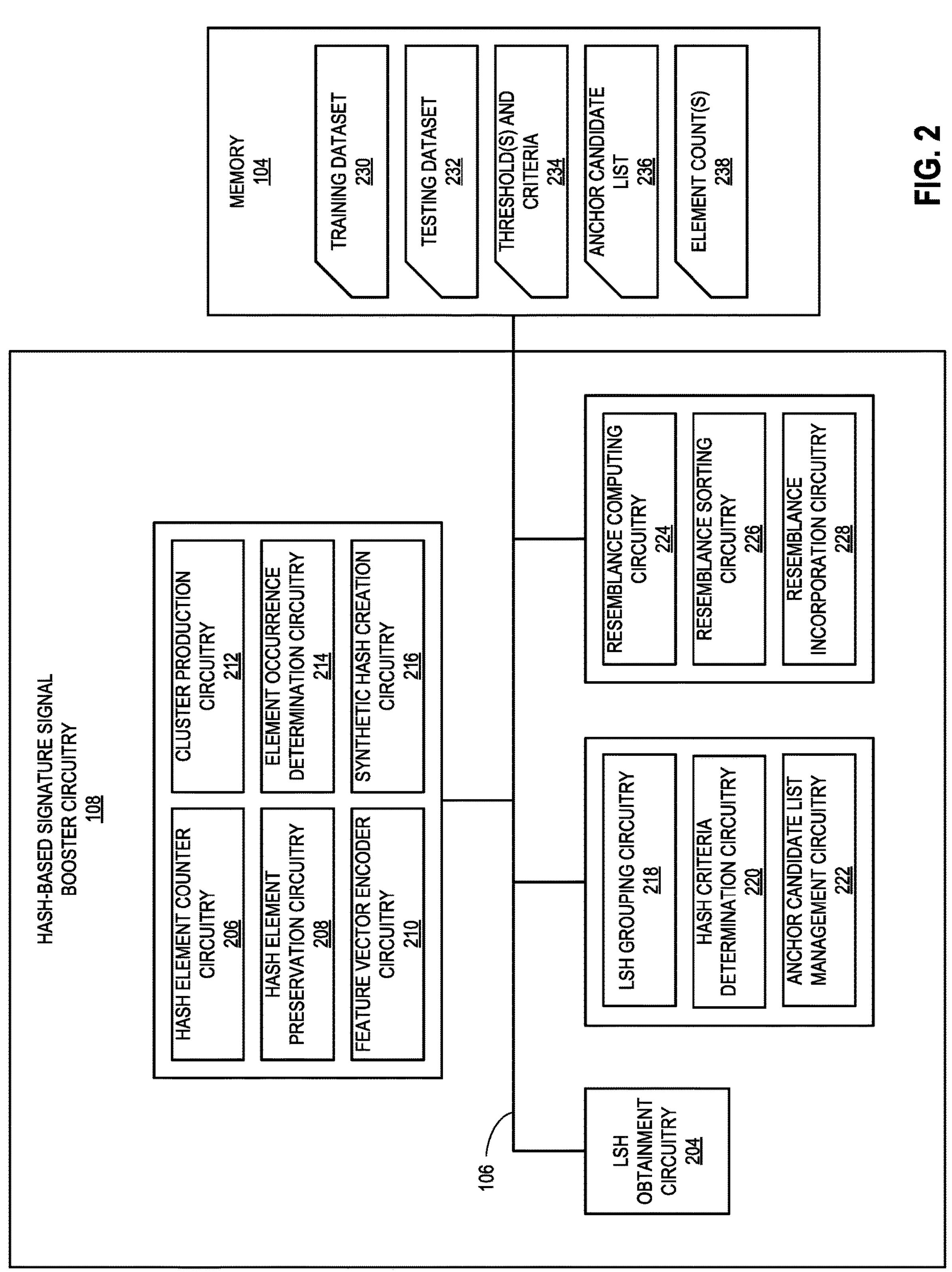
FIG. 2 is a block diagram of example implementations of the hash-based signature signal booster and the memory of FIG. 1.

FIG. 2 is a block diagram of the hash-based signature signal booster circuitry 108 (shown in FIG. 1 in compute node 100) to translate a hash-based signature signal for machine learning applications. The hash-based signature signal booster circuitry 108 of FIGS. 1 and 2 may be instantiated (e.g., creating an instance of, bring into being for any length of time, materialize, implement, etc.) by processor circuitry (e.g., 102 in FIG. 1) such as a central processing unit executing instructions. Additionally or alternatively, the hash-based signature signal booster circuitry 108 of FIGS. 1 and 2 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 2 may, thus, be instantiated at the same or different times. Some or all of the circuitry may be instantiated, for example, in one or more threads executing concurrently on hardware and/or in series on hardware. Moreover, in some examples, some or all of the circuitry of FIG. 2 may be implemented by one or more virtual machines and/or containers executing on the microprocessor.

In the illustrated example in FIG. 2, the hash-based signature signal booster circuitry 108 includes a locality sensitive hash (or locality sensitive hashing) obtainment circuitry 204. In some examples, the LSH obtainment circuitry 204 obtains (e.g., receives, generates, etc.) locality sensitive hashes. In some examples, the LSH obtainment circuitry 204 obtains a locality sensitive hash by performing a hash calculation such as MinHash, SimHash, etc. on a sample of code or information. In some examples, the sample may be an entire file, network packet, or other data encapsulating object or it may be a section (e.g., portion) of such an object, like the header of a file. Locality sensitive hashing is a technique that hashes similar input data into groups (e.g., buckets). Thus, in some examples, the LSH obtainment circuitry 204, using a MinHash or other LSH algorithm creates an output value that includes a set of hash elements equal to the number of permutations of the LSH. FIG. 3A illustrates two example hash computations (an eight permutation MinHash) of two samples from a training or testing dataset.

Figure 4:
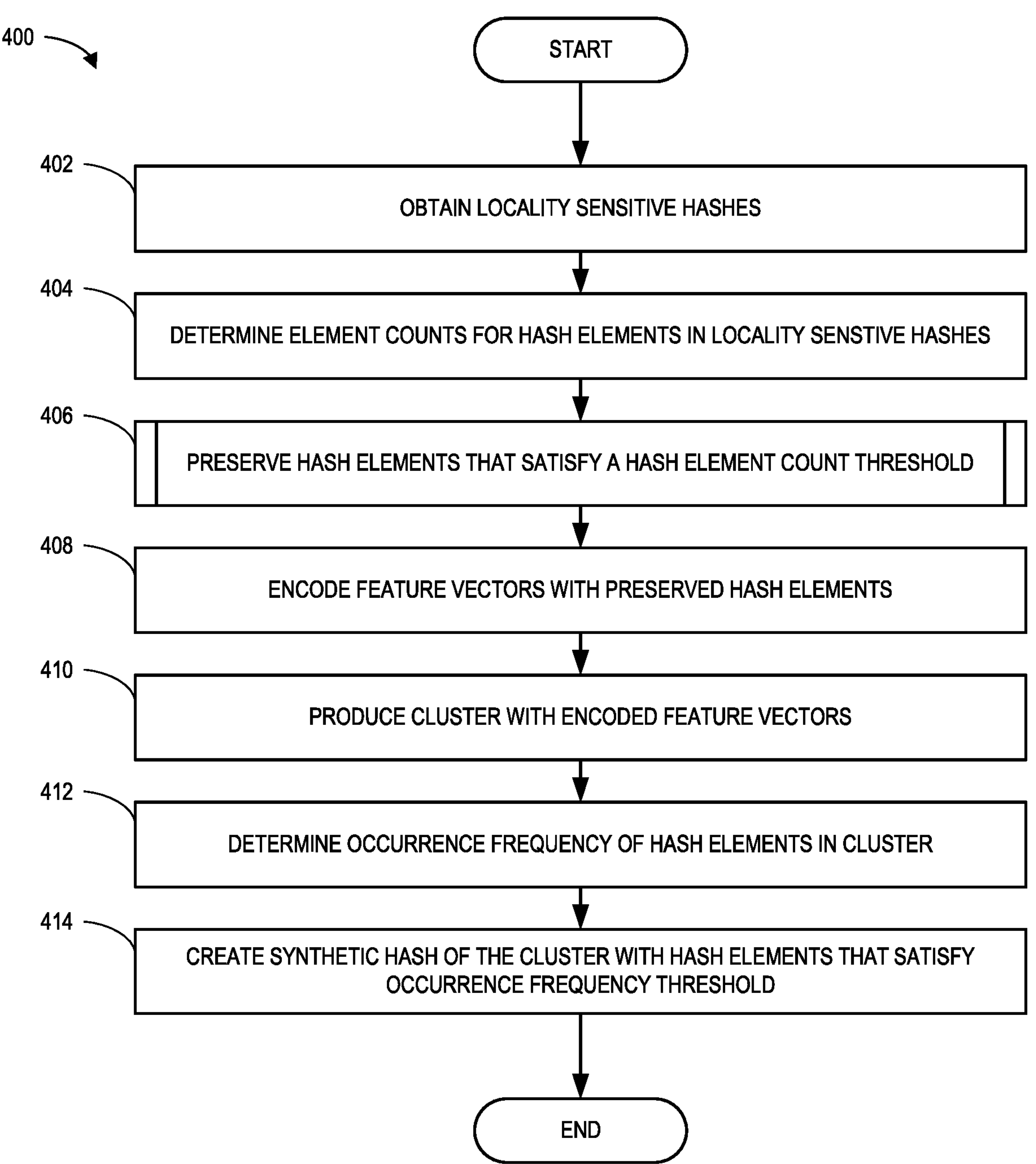
FIG. 4 is a flowchart representative of example machine readable instructions and/or example operations that may be executed by example processor circuitry to implement the hash-based signature signal booster of FIG. 2 using synthetic hashes.
Figure 7:
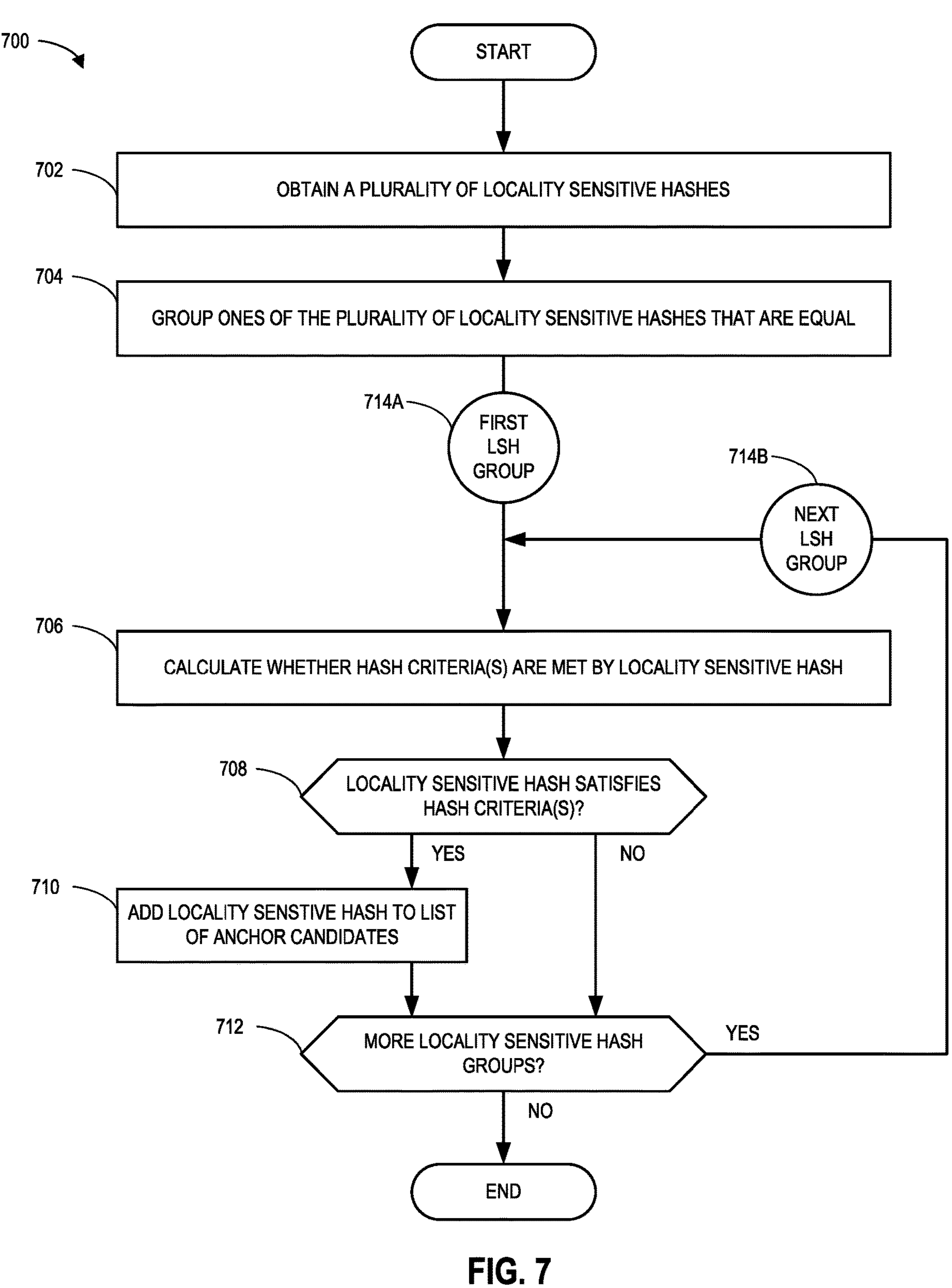
FIG. 7 is a flowchart representative of example machine readable instructions and/or example operations that may be executed by example processor circuitry to implement the hash-based signature signal booster of FIG. 2 using an anchor candidate list.

In some examples, the LSH obtainment circuitry 204 is instantiated by processor circuitry executing LSH obtainment circuitry 204 instructions and/or configured to perform operations such as those represented by the flowcharts of FIGS. 4 and 7.

In some examples, the apparatus includes means for obtaining locality sensitive hashes. For example, the means for obtaining may be implemented by LSH obtainment circuitry 204. In some examples, the LSH obtainment circuitry 204 may be instantiated by processor circuitry such as the example processor circuitry 912 of FIG. 9. For instance, the LSH obtainment circuitry 204 may be instantiated by the example microprocessor 1000 of FIG. 10 executing machine executable instructions such as those implemented by at least blocks 402 of FIG. 4 and, 702 of FIG. 7. In some examples, the LSH obtainment circuitry 204 may be instantiated by hardware logic circuitry, which may be implemented by an ASIC, XPU, or the FPGA circuitry 1100 of FIG. 11 structured to perform operations corresponding to the machine readable instructions. Additionally or alternatively, the LSH obtainment circuitry 204 may be instantiated by any other combination of hardware, software, and/or firmware. For example, the LSH obtainment circuitry 204 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a hash element counter circuitry 206. In some examples, the hash element counter circuitry 206 counts the hash elements in a plurality (e.g., a group or set of more than one) of obtained LSH-based hashes. In some examples, the obtained hashes each have a number of hash elements. For example, the two samples illustrated in FIG. 3A each have eight hash elements. In FIG. 3B, three sample MinHash results are at least partially shown. As an example, if hash element counter circuitry 206 were to count hash elements of the three sample MinHash results in FIG. 3B, hash element 2793460 would show as a count of three because it is present in all three sample MinHash results. In some examples, the hash element count(s) are stored in memory 104 as element count(s) 238.

In some examples, the hash element counter circuitry 206 is instantiated by processor circuitry executing hash element counter circuitry 206 instructions and/or configured to perform operations such as those represented by the flowchart of FIG. 4.

In some examples, the apparatus includes means for determining element counts for the plurality of hash elements across the plurality of locality sensitivity hashes. For example, the means for determining element counts may be implemented by hash element counter circuitry 206. In some examples, the hash element counter circuitry 206 may be instantiated by processor circuitry such as the example processor circuitry 912 of FIG. 9. For instance, the hash element counter circuitry 206 may be instantiated by the example microprocessor 1000 of FIG. 10 executing machine executable instructions such as those implemented by at least block 404 in FIG. 4. In some examples, the hash element counter circuitry 206 may be instantiated by hardware logic circuitry, which may be implemented by an ASIC, XPU, or the FPGA circuitry 1100 of FIG. 11 structured to perform operations corresponding to the machine readable instructions. Additionally or alternatively, the hash element counter circuitry 206 may be instantiated by any other combination of hardware, software, and/or firmware. For example, the hash element counter circuitry 206 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a hash element preservation circuitry 208. In some examples, the hash element preservation circuitry 208 preserves each of the hash elements that have satisfied (e.g., met or exceeded) a minimum hash element count threshold. The example hash element preservation circuitry 208 analyzes the counts from the hash element counter circuitry 206 and preserves hash elements by saving them to a buffer or in a memory or elsewhere for use by other circuitry in the hash-based signature signal booster circuitry 108, notably the feature vector encoder circuitry 210.

In some examples, the hash element preservation circuitry 208 analyzes the hash element counts by navigating (e.g., moving, crawling, etc.) through hash elements per LSH/MinHash result and checking the count per hash element against a hash element count threshold. The navigation path includes two loops, one nested in the other. Thus, for each LSH/MinHash result, the hash element preservation circuitry 208 checks each hash element in the LSH/MinHash result against the hash element count threshold. Once all hash elements for an LSH/MinHash result are checked, then the hash element preservation circuitry 208 moves on to the next LSH/MinHash result and again checks each hash element against the hash element count threshold. This looping process continues until all hash elements in all LSH/MinHash results are checked. At the completion of the process, the hash element preservation circuitry 208 has a complete list of hash elements that satisfy the hash element count threshold (e.g., saved in a memory or buffer).

Figure 5:
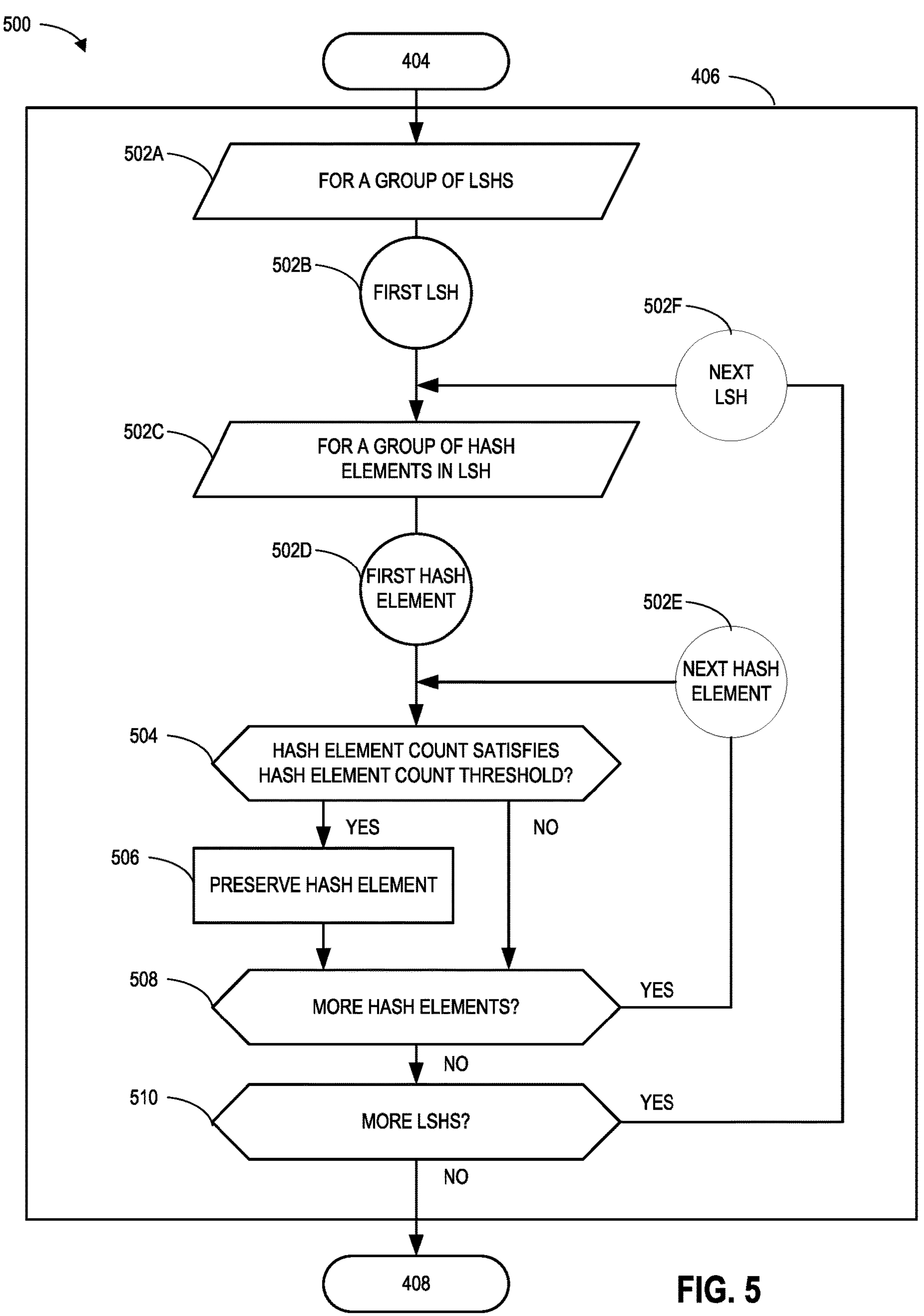
FIG. 5 is a flowchart representative of example machine readable instructions and/or example operations that may be executed by example processor circuitry to implement the preservation of hash elements in the hash-based signature signal booster of FIG. 2.

In some examples, the hash element preservation circuitry 208 is instantiated by processor circuitry executing hash element preservation circuitry 208 instructions and/or configured to perform operations such as those represented by the flowcharts of FIGS. 4 and 5.

In some examples, the apparatus includes means for preserving ones of hash elements of the plurality of hash elements that satisfy an element count threshold. For example, the means for preserving may be implemented by hash element preservation circuitry 208. In some examples, the hash element preservation circuitry 208 may be instantiated by processor circuitry such as the example processor circuitry 912 of FIG. 9. For instance, the hash element preservation circuitry 208 may be instantiated by the example microprocessor 1000 of FIG. 10 executing machine executable instructions such as those implemented by at least blocks 406 of FIGS. 4 and 504, 506, 508, and 510 of FIG. 5. In some examples, the hash element preservation circuitry 208 may be instantiated by hardware logic circuitry, which may be implemented by an ASIC, XPU, or the FPGA circuitry 1100 of FIG. 11 structured to perform operations corresponding to the machine readable instructions. Additionally or alternatively, the hash element preservation circuitry 208 may be instantiated by any other combination of hardware, software, and/or firmware. For example, the hash element preservation circuitry 208 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for preserving includes means for determining whether a hash element count threshold. In some examples, the means for preserving includes means for determining whether there are more hash elements in an LSH. In some examples, the means for preserving includes means for determining whether there are more LSHs in a group of LSHs.

In the illustrated example in FIG. 2, the hash-based signature signal booster circuitry 108 includes the feature vector encoder circuitry 210. In some examples, the feature vector encoder circuitry 210 obtains the preserved hash elements from the hash element preservation circuitry 208 and encodes feature vectors with the preserved hash elements. In some examples, the features in the vectors are the preserved hash elements. The example feature vector encoder circuitry 210 encodes a feature vector by taking an LSH/MinHash result and, for each location in the LSH/MinHash result, compares the hash element value to the preserved hash elements. If the hash element value is one of the preserved hash elements, then the feature vector encoder circuitry 210 encodes the hash element value into the feature vector (in the same location, column-wise of the LSH/MinHash result. If the hash element value is not a preserved hash element, then feature vector encoder circuitry 210 zeroes out hash element in that location in the feature vector. FIG. 3D illustrates an example of encoded feature vectors of three samples from a training or testing dataset.

In some examples, the feature vector encoder circuitry 210 is instantiated by processor circuitry executing feature vector encoder circuitry 210 instructions and/or configured to perform operations such as those represented by the flowchart of FIG. 4.

In some examples, the apparatus includes means for encoding feature vectors with hash elements that satisfy an element count threshold. For example, the means for encoding may be implemented by feature vector encoder circuitry 210. In some examples, the feature vector encoder circuitry 210 may be instantiated by processor circuitry such as the example processor circuitry 912 of FIG. 9. For instance, the feature vector encoder circuitry 210 may be instantiated by the example microprocessor 1000 of FIG. 10 executing machine executable instructions such as those implemented by at least block 408 of FIG. 4. In some examples, the feature vector encoder circuitry 210 may be instantiated by hardware logic circuitry, which may be implemented by an ASIC, XPU, or the FPGA circuitry 1100 of FIG. 11 structured to perform operations corresponding to the machine readable instructions. Additionally or alternatively, the feature vector encoder circuitry 210 may be instantiated by any other combination of hardware, software, and/or firmware. For example, the feature vector encoder circuitry 210 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a cluster production circuitry 212. In some examples, the cluster production circuitry 212 produces a cluster of feature vectors that have been encoded by feature vector encoder circuitry 210. In some examples, the cluster production circuitry 212 may utilize any known clustering algorithm to produce a cluster of feature vectors. FIG. 3D illustrates an example of a cluster of feature vectors, including sample A feature vector, sample B feature vector, and sample C feature vector. In some examples, the cluster production circuitry 212 may line up the features column-wise (e.g., the first feature in the feature vectors in FIG. 3D is the same, 2793460, across all three feature vectors).

In some examples, the cluster production circuitry 212 is instantiated by processor circuitry executing cluster production circuitry 212 instructions and/or configured to perform operations such as those represented by the flowchart of FIG. 4.

In some examples, the apparatus includes means for producing at least one cluster with the encoded feature vectors. For example, the means for producing may be implemented by cluster production circuitry 212. In some examples, the cluster production circuitry 212 may be instantiated by processor circuitry such as the example processor circuitry 912 of FIG. 9. For instance, the cluster production circuitry 212 may be instantiated by the example microprocessor 1000 of FIG. 10 executing machine executable instructions such as those implemented by at least block 410 of FIG. 4 In some examples, the cluster production circuitry 212 may be instantiated by hardware logic circuitry, which may be implemented by an ASIC, XPU, or the FPGA circuitry 1100 of FIG. 11 structured to perform operations corresponding to the machine readable instructions. Additionally or alternatively, the cluster production circuitry 212 may be instantiated by any other combination of hardware, software, and/or firmware. For example, the cluster production circuitry 212 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes an element occurrence determination circuitry 214. In some examples, the element occurrence determination circuitry 214 determines the occurrence of features across the feature vectors in a cluster. For example, a column-wise occurrence of feature 2793460 is in all three feature vectors in the first feature column, thus, the occurrence frequency for feature 2793460 among the three feature vectors shown is 100%. In another example, a column-wise occurrence of feature 22130591 is in sample B feature vector and sample C feature vector in the second feature column, thus, the occurrence frequency for feature 22130591 among the three feature vectors shown is 67%.

In some examples, the element occurrence determination circuitry 214 is instantiated by processor circuitry executing element occurrence determination circuitry 214 instructions and/or configured to perform operations such as those represented by the flowchart of FIG. 4.

In some examples, the apparatus includes means for determining an element count for the hash elements across the locality sensitivity hashes. For example, the means for determining may be implemented by element occurrence determination circuitry 214. In some examples, the element occurrence determination circuitry 214 may be instantiated by processor circuitry such as the example processor circuitry 912 of FIG. 9. For instance, the element occurrence determination circuitry 214 may be instantiated by the example microprocessor 1000 of FIG. 10 executing machine executable instructions such as those implemented by at least block 412 of FIG. 4. In some examples, the element occurrence determination circuitry 214 may be instantiated by hardware logic circuitry, which may be implemented by an ASIC, XPU, or the FPGA circuitry 1100 of FIG. 11 structured to perform operations corresponding to the machine readable instructions. Additionally or alternatively, the element occurrence determination circuitry 214 may be instantiated by any other combination of hardware, software, and/or firmware. For example, the element occurrence determination circuitry 214 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a synthetic hash creation circuitry 216. In some examples, the synthetic hash creation circuitry 216 creates a synthetic hash (e.g., a synthetic LSH, a synthetic MinHash, etc.) by taking a column-wise mode or weighted mode of the feature values in each column in the feature vector cluster, such as the cluster of feature vectors shown in FIG. 3D. For example, a synthetic hash is illustrated in FIG. 3E, which includes the mode of all 3 feature columns in the cluster of feature vectors in FIG. 3D. More detail of the creation of a hash using the mode and the weighted mode options is discussed below in reference to FIG. 4.

In some examples, the synthetic hash creation circuitry 216 is instantiated by processor circuitry executing synthetic hash creation circuitry 216 instructions and/or configured to perform operations such as those represented by the flowchart of FIG. 4.

In some examples, the apparatus includes means for creating at least one synthetic hash with one or more hash elements that satisfy an occurrence frequency threshold. For example, the means for creating may be implemented by synthetic hash creation circuitry 216. In some examples, the synthetic hash creation circuitry 216 may be instantiated by processor circuitry such as the example processor circuitry 912 of FIG. 9. For instance, the synthetic hash creation circuitry 216 may be instantiated by the example microprocessor 1000 of FIG. 10 executing machine executable instructions such as those implemented by at least block 414 of FIG. 4. In some examples, synthetic hash creation circuitry 216 may be instantiated by hardware logic circuitry, which may be implemented by an ASIC, XPU, or the FPGA circuitry 1100 of FIG. 11 structured to perform operations corresponding to the machine readable instructions. Additionally or alternatively, the synthetic hash creation circuitry 216 may be instantiated by any other combination of hardware, software, and/or firmware. For example, the synthetic hash creation circuitry 216 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a LSH grouping circuitry 218. In some examples, the LSH grouping circuitry 218 groups LSH-based hashes (e.g., MinHashes) that are equal into an LSH group. In some examples, the MinHashes include values at one or more column-wise positions, such as the eight samples illustrated in FIG. 3F. In some examples, for the MinHashes to be considered equal, the same hash element appears in each column-wide hash element position. For example, samples 7 and 8 in FIG. 3F are equal because all seven hash elements are identical.

The example LSH grouping circuitry 218 creates groups of all MinHash values present. Thus, in some examples, the MinHash value of samples 1, 3, 6, 7, and 8 are all grouped into a single group because they are all equal. The MinHash values of samples 2, 4, and 5 are each uniquely different in at least one hash element value from any other MinHash value in FIG. 3F. Therefore, the LSH grouping circuitry 218 groups the five MinHash values corresponding to the samples 1, 3, 6, 7, and 8 into a single group and groups the unique MinHash singleton values of the three samples 2, 4, and 5 each into their own group. As a result, post grouping, there is a group of five and three groups of one MinHash values.

In some examples, the LSH grouping circuitry 218 is instantiated by processor circuitry executing LSH grouping circuitry 218 instructions and/or configured to perform operations such as those represented by the flowchart of FIG. 7.

In some examples, the apparatus includes means for grouping ones of the plurality of locality sensitive hashes that are equal into a first locality sensitive hash group. For example, the means for grouping may be implemented by LSH grouping circuitry 218. In some examples, the LSH grouping circuitry 218 may be instantiated by processor circuitry such as the example processor circuitry 912 of FIG. 9. For instance, the LSH grouping circuitry 218 may be instantiated by the example microprocessor 1000 of FIG. 10 executing machine executable instructions such as those implemented by at least block 704 of FIG. 7. In some examples, the LSH grouping circuitry 218 may be instantiated by hardware logic circuitry, which may be implemented by an ASIC, XPU, or the FPGA circuitry 1100 of FIG. 11 structured to perform operations corresponding to the machine readable instructions. Additionally or alternatively, the LSH grouping circuitry 218 may be instantiated by any other combination of hardware, software, and/or firmware. For example, the LSH grouping circuitry 218 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a hash criteria determination circuitry 220. In some examples, the hash criteria determination circuitry 220 determines whether one or more criteria are met for each of the LSH groups created by the LSH grouping circuitry 218. There may be one or more criteria utilized to determine if a LSH group value (e.g., the hash elements that make up each LSH of the group) should be added to a list of anchor candidates (e.g., stored in memory 104 as anchor candidate list 236). In some examples, anchor candidates are LSH values that are common (e.g., frequently present) among the obtained LSHs. An LSH value means a set of hash elements that form an LSH, such as the seven hash elements that form the sample 1 LSH in FIG. 3F. For example, the LSH value common to LSHs 1, 3, 6, 7, and 8 may be considered common if it meets the one or more hash criteria.

In some examples, the hash criteria may include a minimum group maliciousness percentage of the LSHs in the group. The minimum group maliciousness percentage means a calculated percentage of how many LSHs in the group correspond to samples that are of a malicious origin (e.g., the file/process/packet object of the sample has malware, a virus, or other malicious code contained within it). For example, if there are 100 LSHs in the group corresponding to 100 samples and 97 of the 100 samples have malicious code, the group malicious percentage of that particular group is 97%. Thus, if there is a minimum group maliciousness percentage hash criteria set at 95%, the group with a 97% value satisfies that hash criteria. In some examples, the hash criteria may include a minimum group sample threshold of LSHs in the group. The minimum group sample threshold means a number of LSHs that make up the group. For example, if there are 100 LSHs in the group that correspond to 100 samples from a training dataset 230 or testing dataset 232 and the minimum group sample threshold is 80 samples, then the group of 100 LSHs satisfies the minimum group sample threshold. In some examples, the group must satisfy multiple hash criteria, such as both the minimum group maliciousness percentage and the minimum group sample threshold. In some examples, there may be any additional number of hash criteria also determined.

The example hash criteria determination circuitry 220 walks through each of the LSH groups and determines if the criteria are satisfied per LSH group. In some examples, the hash criteria determination circuitry 220 reports the results of the criteria satisfaction per LSH group to the anchor candidate list management circuitry 222.

In some examples, the hash criteria determination circuitry 220 is instantiated by processor circuitry executing hash criteria determination circuitry 220 instructions and/or configured to perform operations such as those represented by the flowchart of FIG. 7.

In some examples, the apparatus includes means for calculating whether an LSH group satisfies at least one hash criteria. For example, the means for calculating may be implemented by hash criteria determination circuitry 220. In some examples, the hash criteria determination circuitry 220 may be instantiated by processor circuitry such as the example processor circuitry 912 of FIG. 9. For instance, the hash criteria determination circuitry 220 may be instantiated by the example microprocessor 1000 of FIG. 10 executing machine executable instructions such as those implemented by at least blocks 706, 708, and 712 of FIG. 7. In some examples, the hash criteria determination circuitry 220 may be instantiated by hardware logic circuitry, which may be implemented by an ASIC, XPU, or the FPGA circuitry 1100 of FIG. 11 structured to perform operations corresponding to the machine readable instructions. Additionally or alternatively, the hash criteria determination circuitry 220 may be instantiated by any other combination of hardware, software, and/or firmware. For example, the hash criteria determination circuitry 220 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for calculating includes means for determining whether the LSH satisfies the hash criteria. In some examples, the means for calculating includes means for determining whether more LSH groups have yet to be analyzed against the hash criteria.

In the illustrated example in FIG. 2, the hash-based signature signal booster circuitry 108 includes an anchor candidate list management circuitry 222. In some examples, the anchor candidate list management circuitry 222 walks through (e.g., views) the LSH groups and adds each LSH value to a list of anchor candidates when the LSH value satisfies the at least one hash criteria. The LSH value is the LSH value common to the LSH group being analyzed/viewed. For example, if the MinHash [2793460, 24130584, 3658984, . . . ] satisfies the at least one hash criteria, then that particular MinHash will be added to the list of anchor candidates. In some examples, the list of anchor candidates is a list of LSHs (e.g., MinHashes) that met the hash criteria.

In some examples, the anchor candidate list management circuitry 222 is instantiated by processor circuitry executing anchor candidate list management circuitry 222 instructions and/or configured to perform operations such as those represented by the flowchart of FIG. 7.

In some examples, the apparatus includes means for adding an LSH to a list of anchor candidates. For example, the means for adding may be implemented by anchor candidate list management circuitry 222. In some examples, the anchor candidate list management circuitry 222 may be instantiated by processor circuitry such as the example processor circuitry 912 of FIG. 9. For instance, the anchor candidate list management circuitry 222 may be instantiated by the example microprocessor 1000 of FIG. 10 executing machine executable instructions such as those implemented by at least block 710 of FIG. 7. In some examples, anchor candidate list management circuitry 222 may be instantiated by hardware logic circuitry, which may be implemented by an ASIC, XPU, or the FPGA circuitry 1100 of FIG. 11 structured to perform operations corresponding to the machine readable instructions. Additionally or alternatively, the anchor candidate list management circuitry 222 may be instantiated by any other combination of hardware, software, and/or firmware. For example, the anchor candidate list management circuitry 222 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a resemblance computing circuitry 224. In some examples, the resemblance computing circuitry 224 computes a resemblance between each LSH corresponding to a sample from the training dataset 230 or the testing dataset 232 vs. one or more synthetic hashes. In some examples, the resemblance computing circuitry 224 computes a resemblance between each LSH corresponding to a sample from the training dataset 230 or the testing dataset 232 vs. the list of anchor candidates. In some examples, the resemblance computation is a Jaccard resemblance. In some examples, the resemblance computation is another resemblance equation that accomplishes results similar to the Jaccard resemblance equation. The resemblance computation is described in greater detail below in regard to the discussion of FIGS. 6 and 8.

Figure 6:
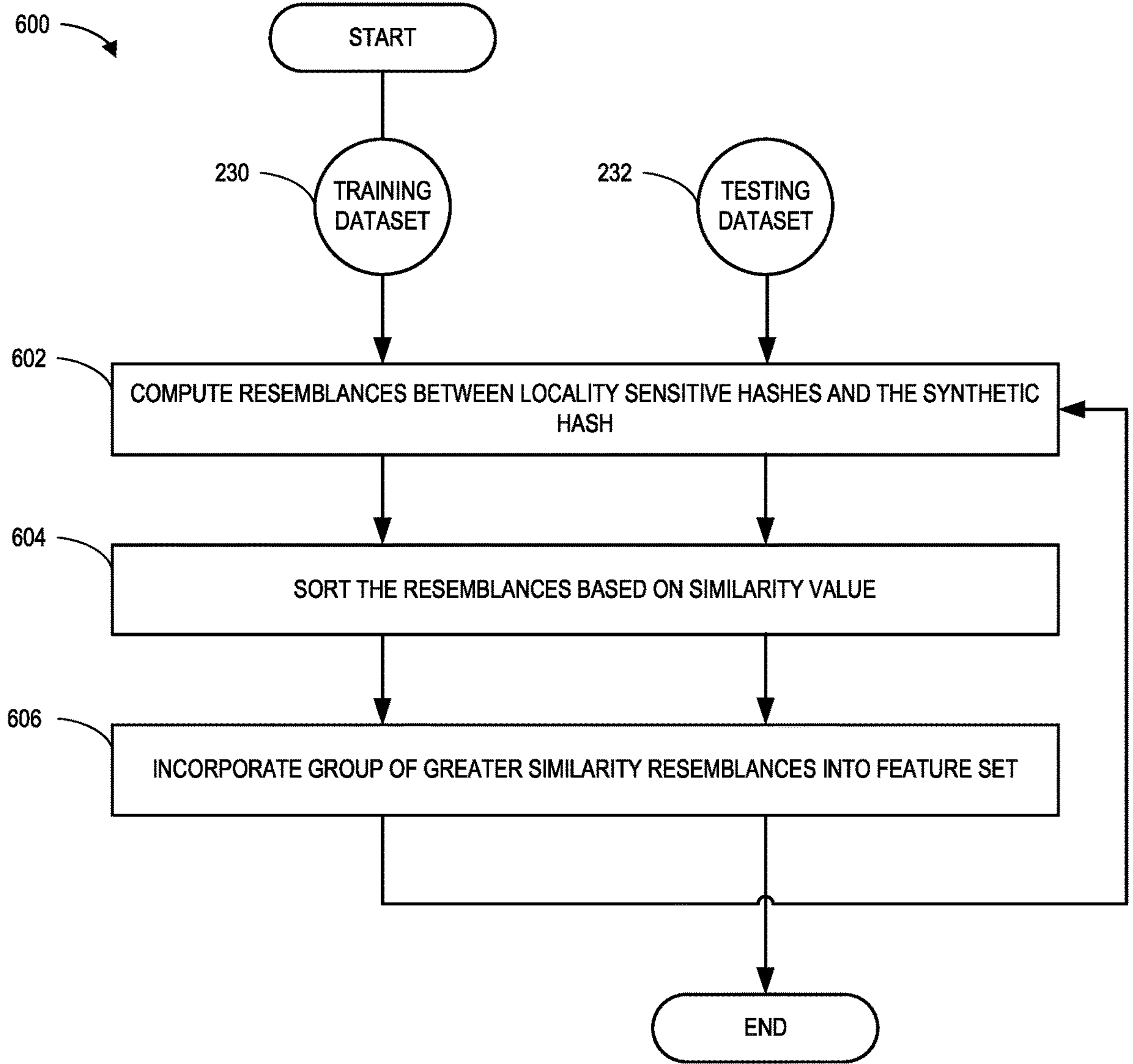
FIG. 6 is a flowchart representative of example machine readable instructions and/or example operations that may be executed by example processor circuitry to implement resemblance calculation, sorting, and incorporation in the hash-based signature signal booster of FIG. 2 using synthetic hashes.
Figure 8:
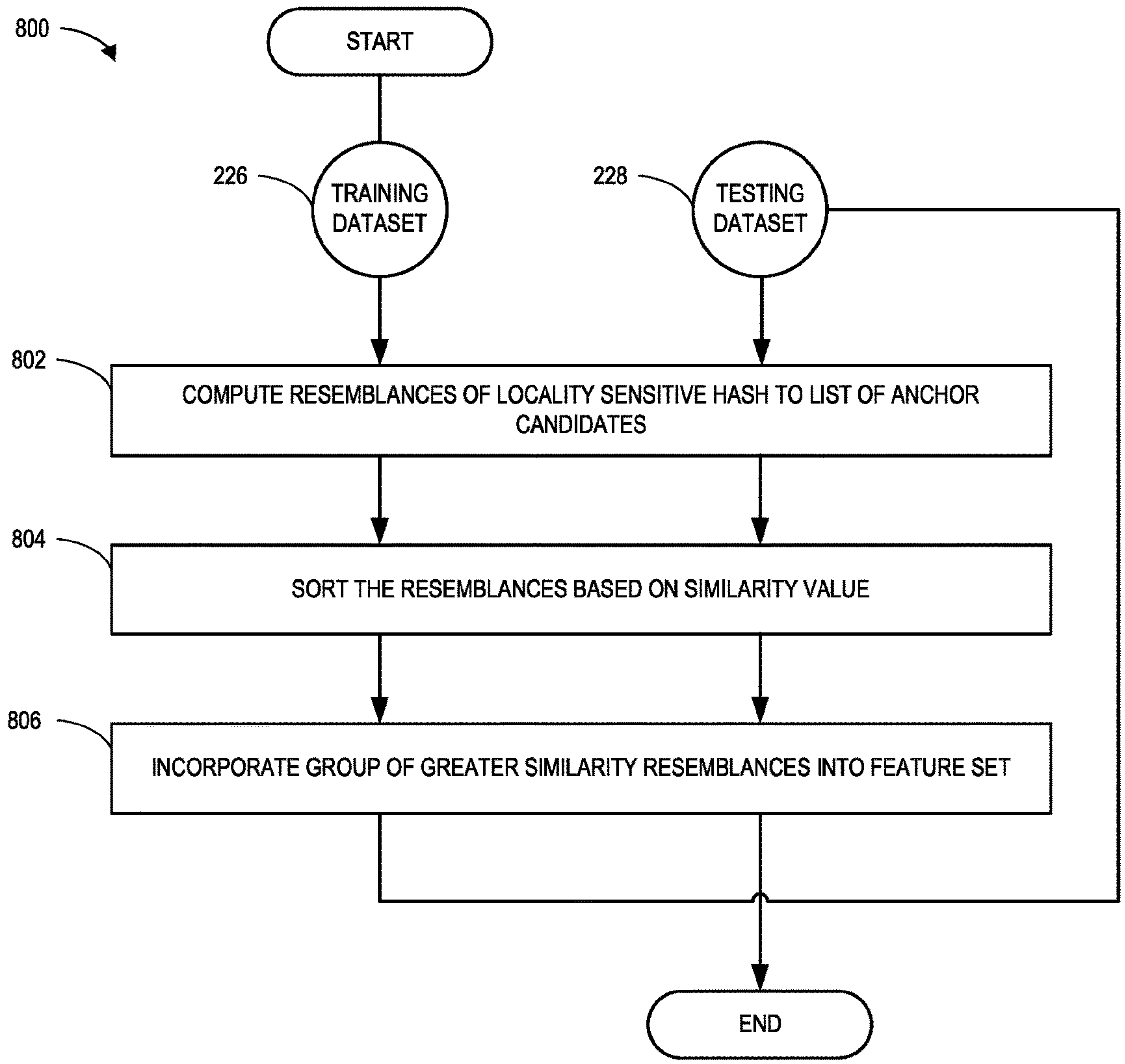
FIG. 8 is a flowchart representative of example machine readable instructions and/or example operations that may be executed by example processor circuitry to implement resemblance calculation, sorting, and incorporation in the hash-based signature signal booster of FIG. 2 using an anchor candidate list.

In some examples, the resemblance computing circuitry 224 is instantiated by processor circuitry executing resemblance computing circuitry 224 instructions and/or configured to perform operations such as those represented by the flowcharts of FIGS. 6 and 8.

In some examples, the apparatus includes means computing resemblances between the LSHs and the at least one synthetic hash. For example, the means for computing may be implemented by resemblance computing circuitry 224. In some examples, the resemblance computing circuitry 224 may be instantiated by processor circuitry such as the example processor circuitry 912 of FIG. 9. For instance, the resemblance computing circuitry 224 may be instantiated by the example microprocessor 1000 of FIG. 10 executing machine executable instructions such as those implemented by at least blocks 602 of FIG. 6 and 802 of FIG. 8. In some examples, the resemblance computing circuitry 224 may be instantiated by hardware logic circuitry, which may be implemented by an ASIC, XPU, or the FPGA circuitry 1100 of FIG. 11 structured to perform operations corresponding to the machine readable instructions. Additionally or alternatively, the resemblance computing circuitry 224 may be instantiated by any other combination of hardware, software, and/or firmware. For example, the resemblance computing circuitry 224 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the means for computing resemblances includes means for computing resemblances of an LSH to a plurality of anchor candidates in a list of anchor candidates.

In the illustrated example in FIG. 2, the hash-based signature signal booster circuitry 108 includes a resemblance sorting circuitry 226. In some examples, the resemblance sorting circuitry 226 sorts the resemblances that were computed by the resemblance computing circuitry 224 by similarity value. In some examples, the Jaccard resemblance equation computes a similarity value between zero and one and the higher the resemblance, the closer the value gets to one. Thus, in some examples, the resemblance sorting circuitry 226 sorts the resemblances from highest resemblance (e.g., the resemblance that has a similarity value closest to one) to lowest resemblance (e.g., the resemblance that has a similarity value closest to zero).

In some examples, the resemblance sorting circuitry 226 is instantiated by processor circuitry executing resemblance sorting circuitry 226 instructions and/or configured to perform operations such as those represented by the flowcharts of FIGS. 6 and 8.

In some examples, the apparatus includes means for sorting resemblances based on similarity value. For example, the means for sorting may be implemented by resemblance sorting circuitry 226. In some examples, the resemblance sorting circuitry 226 may be instantiated by processor circuitry such as the example processor circuitry 912 of FIG. 9. For instance, the resemblance sorting circuitry 226 may be instantiated by the example microprocessor 1000 of FIG. 10 executing machine executable instructions such as those implemented by at least blocks 604 of FIG. 6 and 804 of FIG. 8. In some examples, the resemblance sorting circuitry 226 may be instantiated by hardware logic circuitry, which may be implemented by an ASIC, XPU, or the FPGA circuitry 1100 of FIG. 11 structured to perform operations corresponding to the machine readable instructions. Additionally or alternatively, the resemblance sorting circuitry 226 may be instantiated by any other combination of hardware, software, and/or firmware. For example, the resemblance sorting circuitry 226 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In the illustrated example in FIG. 2, the hash-based signature signal booster circuitry 108 includes a resemblance incorporation circuitry 228. In some examples, the resemblance incorporation circuitry 228 incorporates a number of resemblances with greater or the highest similarity values into a feature set to be implemented when training using samples from the training dataset 230. In some examples, the resemblances are actual numerical values and those values are directly incorporated into the feature set as additional features. The resemblance incorporation is described in greater detail below in regard to the discussion of FIGS. 6 and 8.

In some examples, the resemblance incorporation circuitry 228 is instantiated by processor circuitry executing resemblance incorporation circuitry 228 instructions and/or configured to perform operations such as those represented by the flowcharts of FIGS. 6 and 8.

In some examples, the apparatus includes means for determining a condition of a device. For example, the means for incorporating may be implemented by resemblance incorporation circuitry 228. In some examples, the resemblance incorporation circuitry 228 may be instantiated by processor circuitry such as the example processor circuitry 912 of FIG. 9. For instance, the resemblance incorporation circuitry 228 may be instantiated by the example microprocessor 1000 of FIG. 10 executing machine executable instructions such as those implemented by at least blocks 606 of FIGS. 6 and 806 of FIG. 8. In some examples, the resemblance incorporation circuitry 228 may be instantiated by hardware logic circuitry, which may be implemented by an ASIC, XPU, or the FPGA circuitry 1100 of FIG. 11 structured to perform operations corresponding to the machine readable instructions. Additionally or alternatively, the resemblance incorporation circuitry 228 may be instantiated by any other combination of hardware, software, and/or firmware. For example, the resemblance incorporation circuitry 228 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the memory 104 includes dynamic and/or static storage of the described thresholds and criteria 234, including a hash element count threshold, a minimum group sample threshold, a similarity value threshold, an occurrence frequency threshold, and one or more hash criteria including one or more of a minimum group maliciousness percentage threshold and a minimum group sample threshold, among other thresholds and criteria.

While an example manner of implementing the hash-based signature signal booster circuitry 108 is illustrated in FIG. 2, one or more of the elements, processes, and/or devices illustrated in FIG. 2 may be combined, divided, re-arranged, omitted, eliminated, and/or implemented in any other way. Further, the example LSH obtainment circuitry 204, the example hash element counter circuitry 206, the example hash element preservation circuitry 208, the example feature vector encoder circuitry 210, the example cluster production circuitry 212, the example element occurrence determination circuitry 216, the example LSH grouping circuitry 218, the example hash criteria determination circuitry 220, the example anchor candidate list management circuitry 222, the example resemblance computing circuitry 224, the example resemblance sorting circuitry 226, the example resemblance incorporation circuitry 228, and/or, more generally, the example hash-based signature signal booster circuitry 108 of FIGS. 1 and 2, may be implemented by hardware alone or by hardware in combination with software and/or firmware. Thus, for example, any of the example LSH obtainment circuitry 204, the example hash element counter circuitry 206, the example hash element preservation circuitry 208, the example feature vector encoder circuitry 210, the example cluster production circuitry 212, the example element occurrence determination circuitry 216, the example LSH grouping circuitry 218, the example hash criteria determination circuitry 220, the example anchor candidate list management circuitry 222, the example resemblance computing circuitry 224, the example resemblance sorting circuitry 226, the example resemblance incorporation circuitry 228, and/or, more generally, the example hash-based signature signal booster circuitry 108, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example hash-based signature signal booster circuitry 108 of FIGS. 1 and 2 may include one or more elements, processes, and/or devices in addition to, or instead of, those illustrated in FIG. 2, and/or may include more than one of any or all of the illustrated elements, processes and devices.

A flowchart representative of example hardware logic circuitry, machine readable instructions, hardware implemented state machines, and/or any combination thereof for implementing the hash-based signature signal booster circuitry 108 of FIGS. 1 and 2 is shown in FIG. 4. The machine readable instructions may be one or more executable programs or portion(s) of an executable program for execution by processor circuitry, such as the processor circuitry 912 shown in the example processor platform 900 discussed below in connection with FIG. 9 and/or the example processor circuitry discussed below in connection with FIGS. 10 and/or 11. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 4, many other methods of implementing the example hash-based signature signal booster circuitry 108 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIGS. 4-8 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C.

As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

In some examples, translating hash-based signature signals may include an implementation based at least partially on the creation of one or more synthetic LSHs/MinHashes that are then used to calculate Jaccard resemblances against sample LSH/MinHashes for feature addition when testing. FIGS. 4-6 describe the synthetic LSH/MinHash implementation. In some examples, translating hash-based signature signals may include an implementation based at least partially on the use of anchor points, determined using a weight of evidence, to use for calculating Jaccard resemblances against sample LSH/MinHashes for feature addition when testing. FIGS. 7-8 describe the anchor points implementation.

FIG. 4 is a flowchart representative of example machine readable instructions and/or example operations 400 that may be executed and/or instantiated by processor circuitry to create a synthetic hash to translate a hash-based signature signal. A hash-based signature signal is a derived set of features (e.g., hash elements) that are more likely present in a target sample when the target sample includes malicious content (e.g., malware, virus, etc.). In some examples, the sample can be a file, a process, a network packet, or any other object of interest that needs to be classified as malicious or benign. For simplicity of explanation, a file will be used as the object of interest in the description below, although any possible object of interest that can incorporate malicious or benign code may be utilized. In some examples, an entire file may be based on a single hash signature. In other examples, a hash signature may be obtained from a combination of hashes corresponding to different sections within a file. In yet other examples, a hash signature may be based on one section of a file. For example, there may be hashes calculated for a resource section of a file, an imports section of a file, an overlay bytes section of a file, an exports section of a file, and/or a header section of a file, among other hashes that are related to individual sections of a file. Thus, in some examples, there may be hashes that are obtained for multiple sections of a file and the process flow illustrated in FIG. 4 is performed on each section. In some examples, when training a machine learning model, multiple sections of multiple files may be incorporated into a training dataset 230 of samples.

For any given sample in a training dataset 230, a hash may be obtained from the sample. In some examples, the hash may be obtained using a locality sensitive hash (LSH) based hash calculation such as MinHash, SimHash, etc. For simplicity of explanation, a MinHash will be used as the type of hash computation (e.g., calculation) performed on each sample, but any type of LSH-based hash computation may be performed. In some examples, an LSH-based hash enables performing similarity comparisons between hashes, as discussed below. In some examples, if there are two highly similar samples, the hash-based signature signals of the two samples are likely to have a high resemblance (e.g., a high similarity value), discussed in detail below. For example, FIG. 3A illustrates two example hash computations (an eight permutation MinHash) of two samples from a training or testing dataset. The MinHash of sample 1 and sample 2 are almost identical, except for the highlighted (bolded) value. Thus, with 8 permutation values, the resemblance between the two samples is an 87.5% similarity value (e.g., 7 of 8 permutation values in the hash are identical).

Turning now to FIG. 4, the machine readable instructions and/or the operations 400 of FIG. 4 begin at block 402, at which the example locality sensitive hash obtainment circuitry 204 (FIG. 2) obtains a plurality of locality sensitive hashes (LSHs) corresponding to sections in a plurality of training samples. In some examples, the plurality of training samples are in a training dataset 230. In some examples, the plurality of LSHs include a plurality of hash elements. For example, FIG. 3A illustrates two samples that each have eight hash elements.

At block 404, the example hash element counter circuitry 206 (FIG. 2) determines an element count for the ones of the plurality of hash elements across the plurality of locality sensitivity hashes.

At block 406, the example hash element preservation circuitry 208 (FIG. 2) preserves the hash elements that satisfy a hash element count threshold. In some examples, the hash element count threshold is a value that indicates a minimum number of occurrences of a hash element across a group of LSHs. FIG. 3B illustrates an example of a group of three LSHs obtained from three samples (Sample A, Sample B, and Sample C). In FIG. 3B, a first hash element 2793640 occurs (e.g., is present) in all three sample LSHs (e.g., Sample A, Sample B, and Sample C) and a second hash element 24130584 occurs in only one sample LSH (e.g., Sample A). In some examples, the hash element count threshold is set at two, which means any hash element that repeats at least once across the group of LSHs will satisfy the hash element count threshold. In this example, the hash element preservation circuitry 208 preserves the first hash element 2793640 and does not preserve the second hash element 24130584. In some examples, preserving a hash element means storing the hash element for additional use.

FIG. 3C illustrates an example of the presence of hash elements in samples (e.g., Sample A, Sample B, and Sample C). The example hash element preservation circuitry 208 determines, in the group of three LSHs, that hash element 2793460, hash element 22130591, and hash element 1955933 are preserved. Those three hash elements are preserved because they occur in more than one LSH (e.g., they are present multiple times across the group of LSHs as shown in FIG. 3C).

Turning now to FIG. 5 to provide greater detail within block 406, FIG. 5 is a flowchart representative of example machine readable instructions and/or example operations 500 that may be executed and/or instantiated by processor circuitry. The machine readable instructions and/or the operations 500 of FIG. 5 begin at block 504, but prior to block 504 the flowchart illustrates nested looping logic 502A, 502B, 502C, 502D, 502E, and 502F that is performed by the example hash element preservation circuitry 208. The example process flow entering block 406 from block 404 illustrates that the hash element preservation circuitry 208 operates on a group of one or more LSHs (e.g., locality sensitive hashes) 502A, starting with the first LSH 502B. Within each LSH, the hash element preservation circuitry 208 operates on a group of one or more hash elements 502C, starting with the first hash element 502D.

With the first hash element 502D in the first LSH 502B, the hash element preservation circuitry 208, at block 504, determines if the hash element has satisfied the hash element count threshold, then the hash element preservation circuitry 208, at block 506, preserves the hash element. Then, at block 508, the hash element preservation circuitry 208 determines if there are more hash elements in the current LSH.

Returning to block 504, if the hash element has not satisfied the hash element count threshold, then, at block 508, the hash element preservation circuitry 208 determines if there are more hash elements in the current LSH.

If there are more hash elements in the current LSH, then the hash element preservation circuitry 208 turns to the next hash element 502E to examine and returns to block 504.

If there are no more hash elements in the current LSH, then, at block 510, the hash element preservation circuitry 208 determines if there are more LSHs in the group of LSHs.

If there are more LSHs in the group of LSHs, then the hash element preservation circuitry 208 turns to the next LSH 502F and examines the first hash element 502D of the next LSH 502F and returns to block 504.

If there are no more LSHs in the group of LSHs, then the hash element preservation circuitry 208 finishes the process of FIG. 5 and the process flow turns to block 408 in FIG. 4.

Returning to FIG. 4, at block 408, the example feature vector encoder circuitry 210 encodes feature vectors with ones of hash elements of the plurality of hash elements that are preserved. A feature vector is an n-dimensional vector of numerical features that describe an object in pattern recognition. In some examples, the feature vector encoder circuitry 210 uses a one-hot encode encoding algorithm to encode the feature vector. For example, in the group of three sample LSHs illustrated in FIG. 3B, where the hash element count threshold is two, the feature vector encoder circuitry 210 encodes a feature vector with at least hash element 2793460, hash element 22130591, and hash element 1955933 because those are the three hash elements that occur in more than one LSH. E.g., they are present multiple times across the group of LSHs, denoted by the 1's in FIG. 3C. In some examples, the feature vector encoder circuitry 210 discards hash elements that do not meet the hash element count threshold (e.g., are below the minimum number of occurrences of the hash element among the LSH samples). In some examples, if a hash element is discarded, that hash element in the encoded feature vector is set to zero. Example encoded feature vectors of samples A, B, and C from FIG. 3B are illustrated in FIG. 3D. In some examples, the feature vector encoder circuitry 210 may encode additional features into the feature vectors shown in FIG. 3D if additional hash elements in FIG. 3B meet the hash element count threshold (e.g., denoted by the ellipsis at the end of each sample).

At block 410, the example cluster production circuitry 212 produces at least one cluster with the one or more encoded feature vectors. A cluster means a group of feature vectors that are associated based on similarity of the contents (e.g., hash elements) of the feature vectors. FIG. 3D illustrates an example cluster of feature vectors. In some examples, clustering algorithms such as TSNE (t-distributed stochastic neighborhood embedding), PCA (principal component analysis), or any other clustering algorithm may be used to dimensionally reduce the feature vectors. As a result, the example cluster production circuitry 212 clusters the vectors resulting from the preserved hash elements.

At block 412, the example element occurrence determination circuitry 214 determines an occurrence frequency of the plurality of hash elements in the at least one cluster. In some examples, the element occurrence determination circuitry 214 utilizes a column-wise mode function to determine the greatest frequency occurrence of a feature in a column. For example, in the first feature column, feature 2793460 is the more or most common feature. In this particular example, all three sample feature vectors have feature 2793460 in the first feature column, but in other examples, there may be many samples and several rows that have different features in the first feature column, thus, the mode determines the more or most common of those several features. In other examples, if a centroid to the cluster exists, then a weighted mode may be used to amplify the impact of the cluster location instead of using the raw maximum number of features. In some examples, the centroid can be used to weight each of the features according to a relative distance from the centroid of the cluster.

At block 414, the example synthetic hash creation circuitry 216 creates at least one synthetic hash of the at least one cluster with a first group of hash elements of the plurality of hash elements that satisfy an occurrence frequency threshold. FIG. 3E illustrates an example synthetic hash (e.g., a synthetic LSH, a synthetic MinHash, etc.). The synthetic hash creation circuitry 216 establishes a synthetic hash by encoding a vector with each of the features determined, column-wise, from block 412 (e.g., the feature that is the mode or weighted mode) of that column in the cluster) and the process of FIG. 4 is finished.

In some examples, when the hash element count threshold is one, all hash elements in the samples are captured as features. This may become computationally intense when clustering hash elements to determine a feature vector to utilize for training purposes. In some examples, having a hash element count threshold at two removes all "singleton" hash elements, which do not contribute to latter steps of the process described below, and provides more efficient clustering by using repeatable hash elements. In some examples, a hash element count threshold greater than two results in a trade-off of losing portions of the signal of features at the benefit of narrower feature vectors to use during initial clustering. Losing portions of the signal refers to not capturing all hash elements that are repeating in the hash-based signature. For example, if the minimum hash element count threshold is five, then any hash elements observed as repeating between two and four times across the training set of samples are not captured to be utilized in the synthetic hash.

FIG. 6 is a flowchart representative of example machine readable instructions and/or example operations 600 that may be executed and/or instantiated by processor circuitry to incorporate resemblance similarity values as a feature set into an example training dataset 230 and an example testing dataset 232 of FIG. 2. In some examples, the process of FIG. 6 may be performed once, while in other implementations the process in FIG. 6 is performed at least twice, a first time through using a training dataset 230 of samples, and a second time through using a testing dataset 232 of samples (as illustrated in FIG. 6). For example, a dataset may include 10,000 samples, which can be objects such as entire files, processes, network packets, etc., or sections of those objects. The 10,000 objects are to be classified (e.g., as malicious or benign). For machine learning applications, the 10,000 sample dataset is split into the training dataset 230 and the testing dataset 232. The machine learning algorithm trains on the training dataset 230 (e.g., 80% of the samples) and then tests on the testing dataset 232 (e.g., the remaining 20% of the samples). In some examples, a goal is to translate the hash-based signatures from the samples into numerical values that are usable as features for machine learning.

In some examples, the process illustrated in FIG. 4 is performed with the training dataset 230 but is not performed with the testing dataset 232. Thus, in some examples, the FIG. 6 process flow described below can be performed a first time using the training dataset 230 samples and the synthetic hashes created from training dataset samples (e.g., with the process illustrated in FIG. 4), and then the FIG. 6 process flow can repeat using the testing dataset 232 samples and the synthetic hashes created from the training dataset samples. Thus, in some examples, the synthetic hashes are not recreated using testing dataset samples.

Turning to the operations illustrated in FIG. 6, the machine readable instructions and/or the operations 600 of FIG. 6 begin at block 602 in a first pass of the process flow using the training dataset 230 samples, at which the example resemblance computing circuitry 224 (FIG. 2) computes a plurality of resemblances between the plurality of training dataset 230 sample LSHs and the at least one synthetic hash (e.g., a synthetic LSH). In some examples, the at least one synthetic hash was/were created through the process described in FIG. 4. In some examples, the resemblance computing circuitry 224 computes the resemblance between each training dataset 230 sample LSH (e.g., the samples shown in FIG. 3B) obtained by the LSH obtainment circuitry 204 and the synthetic hashes that were created through the process described in FIG. 4. In some examples, the resemblance is a Jaccard resemblance (also referred to as the Jaccard similarity coefficient or the Jaccard index) and is a statistic used for determining the similarity of datasets.

Thus, for each training dataset 230 sample LSH (e.g., such as the three shown in FIG. 3B), the resemblance computing circuitry 224 (FIG. 2) calculates a resemblance (e.g., a similarity value) corresponding to the features (e.g., hash elements) in the training dataset 230 sample LSH compared to the features in each created synthetic hash from FIG. 4. According to the illustrated example, a resemblance is a similarity value (e.g., a numerical value) representing how similar a training dataset 230 sample LSH is to a synthetic hash. In some examples, similarity relates to how many hash elements/features are present in both the training dataset 230 sample LSH and each synthetic hash. For example, hash element 2793460 is both in the sample A LSH in FIG. 3B and in the synthetic hash in FIG. 3E, thus that hash element/feature would contribute to a higher similarity value when the resemblance is computed between the sample A LSH and the synthetic hash, creating a list of resemblances (e.g., a list of similarity values). The example similarity values are numbers between zero (e.g., the least similar) and one (e.g., the most similar). Thus, the higher the value, the more similar the training dataset 230 sample LSH is to the synthetic hash. Alternatively, other types of values, ranges, and similarity value structures may be used.

At block 604, the example resemblance sorting circuitry 226 (FIG. 2) sorts the plurality of resemblances based on the similarity values. According to the illustrated example, after the sorting, the resemblance with greater or the highest similarity value is at the top of a list of the plurality of resemblances, and the resemblance with the lowest similarity value is at the bottom of the list of the plurality of resemblances.

At block 606, the example resemblance incorporation circuitry 228 (FIG. 2) incorporates one or more of the computed resemblances, based on similarity value, into a feature set for the training dataset 230 of samples. The example resemblance incorporation circuitry 228 compares each resemblance to a similarity value threshold and the resemblances that satisfy the similarity value threshold (e.g., are greater than or equal to the similarity threshold value) are included into the training dataset 230. Alternatively, a subset of resemblances may be compared. In some examples, the similarity value threshold is a percentage of similarity. For example, any resemblance of at least 75% in similarity value (e.g., a Jaccard resemblance of 0.75) is added to the feature set. Any other percentage of similarity can be utilized as the similarity value threshold in additional examples. In other examples, the similarity value threshold is a set number of the top resemblances, regardless of their similarity values. For example, if there are 1,000 resemblances calculated, the top three resemblances by similarity value (or any other number of top resemblances), in a sorted list of resemblances, may be added to the feature set.

In some examples, the similarity values that satisfy the similarity threshold value are directly incorporated into the training dataset as numerical values. Thus, in some examples, the synthetic hashes that are created from the process illustrated in FIG. 4 can be used as a set of vectors where the resemblance to the set can be utilized as a feature vector added to the training dataset. In other examples, the synthetic hashes can be used to directly classify samples from the training dataset. The direct classification approach with synthetic LSHs can be incorporated into the examples described below with regard to FIG. 7.

The illustrated example process in FIG. 6 is performed a second time using testing dataset 232 samples. In the illustrated example of FIG. 6, at the first completion of block 606, the process returns to block 602, now utilizing the testing dataset 232 samples. At block 602, in a second pass of the process flow using the testing dataset 232 samples, at which the example resemblance computing circuitry 224 computes a plurality of resemblances (e.g., similarity values) between the plurality of testing dataset 232 sample LSHs and the at least one synthetic hash (e.g., a synthetic LSH).

At block 604 in the second pass, the example resemblance sorting circuitry 226 sorts the plurality of resemblances based on the similarity values.

At block 606 in the second pass, the example resemblance incorporation circuitry 228 incorporates at least one or more of the resemblances that satisfy a similarity value threshold into a feature set for the testing dataset 232 of samples. In some examples, the similarity value threshold is a percentage of similarity. In other examples, the similarity value threshold is a set number of the top resemblances, regardless of their similarity values. In some examples, the similarity values that satisfy the similarity threshold value are directly incorporated into the training dataset as numerical values. Thus, in some examples, the synthetic hashes that are created from the process illustrated in FIG. 4 can be used as a set of vectors where the resemblance to the set can be utilized as a feature vector added to the testing dataset 232. In other examples, the synthetic hashes can be used to directly classify samples from the testing dataset 232. The direct classification approach with synthetic LSHs can be incorporated into the examples described below with regard to FIG. 7.

FIG. 7 is a flowchart representative of example machine readable instructions and/or example operations 700 that may be executed and/or instantiated by processor circuitry to translate an example hash-based signature signal using a weight of evidence approach. The machine readable instructions and/or the operations 700 of FIG. 7 begin at block 702, at which the example locality sensitive hash obtainment circuitry 204 (FIG. 2) obtains a locality sensitive hash (LSH) corresponding to a section of a training sample. In some examples, the training sample is in a training dataset 230 of samples. According to the illustrated example, the locality sensitive hash obtainment circuitry 204 computes a MinHash for ones of corresponding sections of the plurality of training samples from the training dataset 230.

At block 704, the example LSH grouping circuitry 218 groups ones of the plurality of locality sensitive hashes that are equal into a first locality sensitive hash group, the first locality sensitive hash group corresponding to a first locality sensitive hash of the plurality of locality sensitive hashes. FIG. 3F illustrates an example of the results of eight LSH computations from samples 1-8 in a training dataset 230. In some examples, the LSH grouping circuitry 218 groups the LSH computed for samples 1, 3, 6, 7, and 8 together because they are equal (e.g., each of the seven hash elements shown is the same value). In a larger dataset of, for example, 8,000 samples, the obtained LSHs for samples 1, 3, 6, 7, and 8 may also be equal to the LSH for many additional samples, such as 100 samples. Additionally, in some examples other obtained LSHs among the 8,000 samples may also be equal to one of the other sample LSHs shown, such as LSHs for samples 2, 4, and 5. Thus, in some examples, the LSH grouping circuitry 218 may create any number of groups of LSHs where the LSHs in each group are all equal.

Once block 704 completes and the groups of LSHs are present, then the hash criteria determination circuitry 220 (FIG. 2) begins a looping process that moves through each of the LSH groups. The looping process starts with the first LSH group 714A, where, at block 706, the hash criteria determination circuitry 220 (FIG. 2) calculates whether the current LSH group satisfies the hash criteria. In some examples, the hash criteria may include a minimum group maliciousness percentage of the LSHs in the group. The minimum group maliciousness percentage means a calculated percentage of how many LSHs in the group correspond to samples that are of a malicious origin (e.g., the file/process/packet object of the sample has malware, a virus, or other malicious code contained within it). For example, if there are 100 LSHs in the group corresponding to 100 samples and 97 of the 100 samples have malicious code, the group malicious percentage of that particular group is 97%. Thus, if there is a minimum group maliciousness percentage hash criteria set at 95%, the group with a 97% value satisfies that hash criteria. In some examples, the hash criteria may include a minimum group sample threshold of LSHs in the group. The minimum group sample threshold means a number of LSHs that make up the group. For example, if there are 100 LSHs in the group that correspond to 100 samples from the training dataset 230 and the minimum group sample threshold is 80 samples, then the group of 100 LSHs satisfies the minimum group sample threshold. In some examples, the group must satisfy multiple hash criteria, such as both the minimum group maliciousness percentage and the minimum group sample threshold. In some examples, there may be any additional number of hash criteria also determined.

In some examples, the hash criteria determination circuitry 220 determines a criteria or a set of criteria through a weight of evidence (WoE) determination (e.g., calculation). FIG. 3G illustrates an example of the hash criteria used to determine whether to add a LSH to an anchor candidate list. For example, a selection criteria may be at least 80 supporting samples (e.g., the minimum group sample threshold) and at least 95% of the samples are malicious (e.g., the minimum group maliciousness percentage). Thus, in the illustrated example of FIG. 3G, MinHash [2793460, 24130584, 3658984, . . . ] has 100 samples and 97 of these samples are malicious (97%, or WoE −0.03). Thus, MinHash [2793460, 24130584, 3658984, . . . ] the meets the criteria selected. MinHash [42544136, 24130584, 3658984, . . . ] has 163 samples and 99 of these samples are malicious (60.7%, or WoE −0.39) so MinHash [42544136, 24130584, 3658984, . . . ] does not meet the criteria because the minimum group sample threshold is not met. MinHash [22813171, 24130584, 3658984, . . . ] has 25 samples and 24 of these samples are malicious (96%, or WoE −0.04) so MinHash [22813171, 24130584, 3658984, . . . ] does not meet the criteria because the minimum group maliciousness percentage is not met.

Then, at block 708, the hash criteria determination circuitry 220 checks to see if the LSH value corresponding to a group of LSHs (e.g., the hash elements in MinHash [2793460, 24130584, 3658984, . . . ] in FIG. 3G) satisfies the hash criteria (e.g., using the calculation just performed in block 706). If the LSH value does not satisfy the hash criteria, then, at block 712, the hash criteria determination circuitry 220 determines if more LSH groups are present to perform the block 706 calculation on. If there are no more LSH groups, then the process ends. Otherwise, if there are more LSH groups, then the process returns to block 706 to have the hash criteria determination circuitry 220 calculate whether the hash criteria are met with the next LSH group 714B.

Returning to block 708, if the hash criteria determination circuitry 220 determines that the LSH value corresponding to the group of LSHs does satisfy the criteria, then the process continues to block 710. At block 710, the anchor candidate list management circuitry 222 adds the LSH value (e.g., again, the hash elements in MinHash [2793460, 24130584, 3658984, . . . ] in FIG. 3G) to a list of anchor candidates (e.g., anchor candidate list 236 in FIG. 2) in response to the LSH satisfying at least one hash criteria. The anchor candidate list 236 is a list of LSHs that satisfy each of the hash criteria and can be utilized to compare against for additional LSHs corresponding to samples in either or both of the training dataset 230 and the testing dataset 232. The comparison of sample LSHs to the anchor candidate list are illustrated in FIG. 8 and described below.

After block 710 completes, the process continues at block 712, where the hash criteria determination circuitry 220 determines if more LSH groups are present to perform the block 706 calculation on. If there are no more LSH groups, then the process ends. Otherwise, if there are more LSH groups, then the process returns to block 706 to have the hash criteria determination circuitry 220 calculate whether the hash criteria are met with the next LSH group 714B.

FIG. 8 is a flowchart representative of example machine readable instructions and/or example operations 800 that may be executed and/or instantiated by processor circuitry to incorporate resemblance similarity values, corresponding to an example list of anchor candidates, as a feature set in an example training dataset 230 and an example testing dataset 232 of FIG. 2. In some examples, the process in FIG. 8 is performed at least twice, a first time through using a training dataset 230 of samples, and a second time through using a testing dataset 232 of samples (as illustrated in FIG. 8). For example, a dataset may include 10,000 samples/objects, which can be objects such as entire files, processes, network packets, etc., or sections of those objects. The 10,000 objects are to be classified (e.g., as malicious or benign). For machine learning applications, the 10,000 sample dataset is split into the training dataset 230 and the testing dataset 232. The machine learning algorithm trains on a training dataset 230 (e.g., 80% of the samples) and then tests on the testing dataset 232 (e.g., the remaining 20% of the samples). In some examples, a goal is to translate the hash-based signatures from the samples into numerical values that are usable as features for machine learning.

In some examples, the process illustrated in FIG. 7 is performed with the training dataset 230 but is not performed with the testing dataset 232. Thus, in some examples, the FIG. 8 process flow described below can be performed a first time using the training dataset 230 samples and the synthetic hashes created from training dataset samples (e.g., with the process illustrated in FIG. 7), and then the FIG. 8 process flow can repeat using the testing dataset 232 samples and the synthetic hashes created from the training dataset samples. Thus, in some examples, the synthetic hashes are not recreated using testing dataset samples.

Turning to the operations illustrated in FIG. 8, the machine readable instructions and/or the operations 800 of FIG. 8 begin at block 802 in a first pass of the process flow using the training dataset 230 samples, at which the example resemblance computing circuitry 224 (FIG. 2) computes resemblances between the training dataset 230 sample LSH and the list of anchor candidates. In some examples, an anchor candidate in the list may be MinHash [2793460, 24130584, 3658984, . . . ] shown in FIG. 3G. In some examples, the resemblance computing circuitry 224 computes the resemblance between the training dataset 230 sample LSH obtained by the LSH obtainment circuitry 204 and each anchor candidate in the anchor candidate list 236 created/modified through the process described in FIG. 7. For example, the training dataset 230 sample LSH may be Sample 1 in FIG. 3F and the resemblance computing circuitry 224 calculates the resemblance of Sample 1 against (e.g., in comparison to) each anchor candidate in the anchor candidate list 236. In some examples, the resemblance is a Jaccard resemblance.

Thus, for each training dataset 230 sample LSH (e.g., such as the eight shown in FIG. 3F), the resemblance computing circuitry 224 (FIG. 2) calculates a resemblance (e.g., a similarity value) corresponding to the features (e.g., hash elements) in the training dataset 230 sample LSH compared to the features in each anchor candidate in the anchor candidate list 236. According to the illustrated example, the resemblance is a similarity value (e.g., a numerical value) representing how similar a training dataset 230 sample LSH is to each anchor candidate. In some examples, similarity relates to how many hash elements/features are present in both the training dataset 230 sample LSH and each anchor candidate. The example similarity values are numbers between zero (e.g., the least similar) and one (e.g., the most similar). Thus, the higher the value, the more similar the training dataset 230 sample LSH is to the anchor candidate. Alternatively, other types of values, ranges, and similarity value structures may be used.

At block 804, the example resemblance sorting circuitry 226 (FIG. 2) sorts the plurality of resemblances based on the similarity values. According to the illustrated example, after the sorting, the resemblance with greater or the highest similarity value is at the top of a list of the plurality of resemblances, and the resemblance with the lowest similarity value is at the bottom of the list of the plurality of resemblances.

At block 806, the example resemblance incorporation circuitry 228 (FIG. 2) incorporates one or more of the computed resemblances, based on similarity value, into a feature set for the training dataset 230 of samples. In some examples, the example resemblance incorporation circuitry 228 compares each resemblance to a similarity value threshold and the resemblances that satisfy the similarity threshold value (e.g., are greater than or equal to the similarity threshold value) are included into the training dataset. Alternatively, a subset of resemblances may be compared. In some examples, the similarity value threshold is a percentage of similarity. For example, any resemblance of at least 75% in similarity value (e.g., a Jaccard resemblance of 0.75) is added to the feature set. Any other percentage of similarity can be utilized as the similarity value threshold in additional examples. In other examples, the similarity value threshold is a set number of the top resemblances, regardless of their similarity values. For example, if there are 1,000 resemblances calculated, the top three resemblances by similarity value (or any other number of top resemblances), in a sorted list of resemblances, may be added to the feature set.

In some examples, the similarity values that satisfy the similarity threshold value are directly incorporated into the training dataset as numerical values. Thus, in some examples, the anchor candidates from the anchor candidate list 236 that are created/modified from the process illustrated in FIG. 7 can be used as a set of vectors where the resemblance to the set can be utilized as a feature vector added to the training dataset. In other examples, the anchor candidates from the anchor candidate list 236 can be used to directly classify samples from the training dataset.

The illustrated example process in FIG. 8 is performed a second time using testing dataset 232 samples. In the illustrated example of FIG. 8, at the first completion of block 806, the process returns to block 802, now utilizing the testing dataset 232 samples. At block 802, in a second pass of the process flow using the testing dataset 232 samples, the example resemblance computing circuitry 224 computes a plurality of resemblances (e.g., similarity values) between a testing dataset 232 sample LSH and the anchor candidates from the anchor candidate list 236.

At block 804 in the second pass, the example resemblance sorting circuitry 226 sorts the plurality of resemblances based on the similarity values.

At block 806 in the second pass, the example resemblance incorporation circuitry 228 incorporates at least one or more of the resemblances that satisfy a similarity value threshold into a feature set for the testing dataset 232 of samples. In some examples, the similarity value threshold is a percentage of similarity. In other examples, the similarity value threshold is a set number of the top resemblances, regardless of their similarity values. In some examples, the similarity values that satisfy the similarity threshold value are directly incorporated into the training dataset as numerical values. Thus, in some examples, the anchor candidate list 236 that is created/modified from the process illustrated in FIG. 7 can be used as a set of vectors where the resemblance to the set can be utilized as a feature vector added to the testing dataset 232. In other examples, the anchor candidates from the anchor candidate list 236 can be used to directly classify samples from the testing dataset 232.

Figure 9:
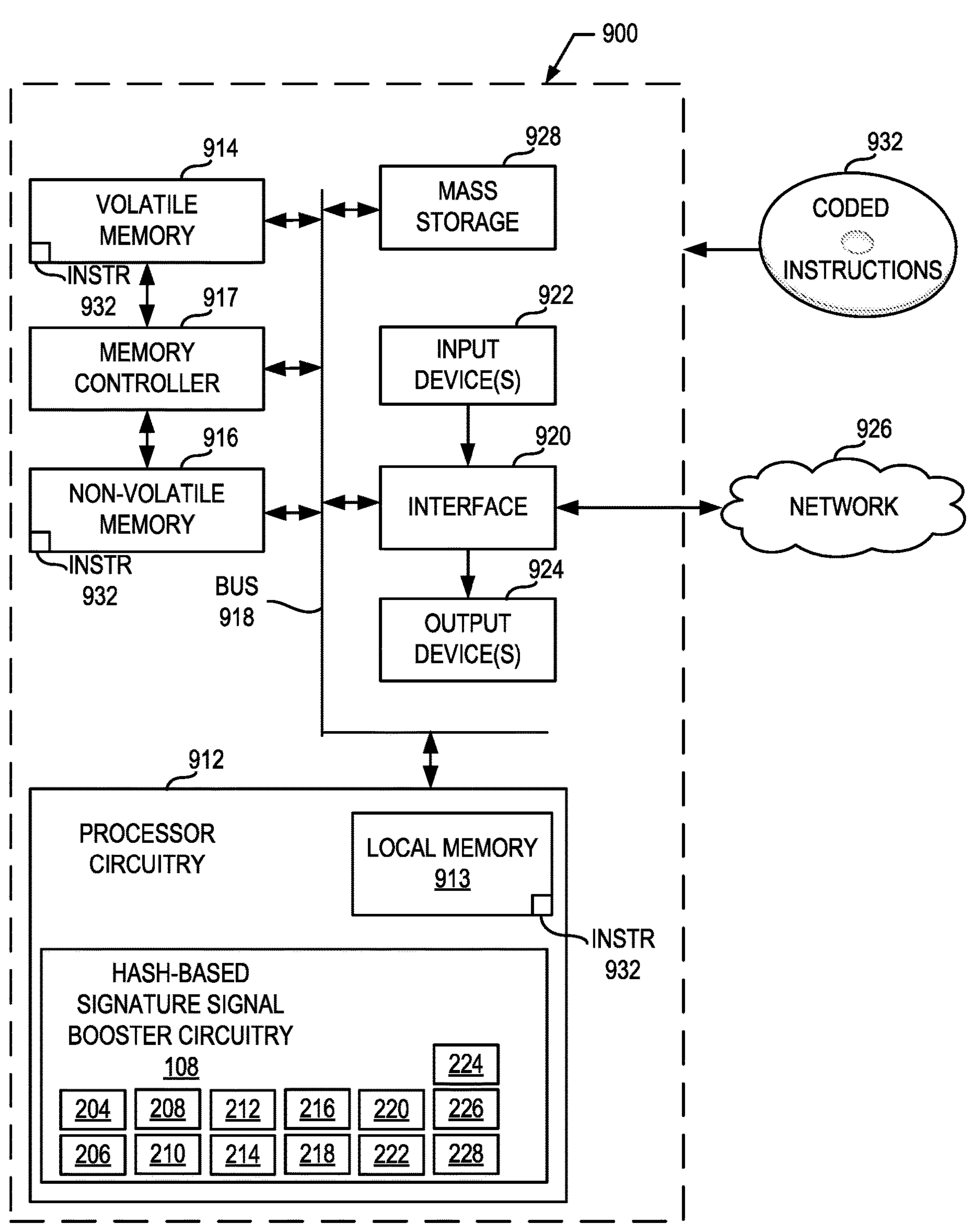
FIG. 9 is a block diagram of an example processing platform including processor circuitry structured to execute the example machine readable instructions and/or the example operations of FIGS. 4-8 to implement the hash-based signature signal booster of FIG. 2.

FIG. 9 is a block diagram of an example processor platform 900 structured to execute and/or instantiate the machine readable instructions and/or the operations of FIGS. 4-8 to implement the hash-based signature signal booster circuitry 108 of FIGS. 1 and 2. The processor platform 900 can be, for example, a server, a personal computer, a workstation, a self-learning machine (e.g., a neural network), or any other type of computing device.

The processor platform 900 of the illustrated example includes processor circuitry 912. The processor circuitry 912 of the illustrated example is hardware. For example, the processor circuitry 912 can be implemented by one or more integrated circuits, logic circuits, FPGAs, microprocessors, CPUs, GPUs, DSPs, and/or microcontrollers from any desired family or manufacturer. The processor circuitry 912 may be implemented by one or more semiconductor based (e.g., silicon based) devices. In this example, the processor circuitry 912 implements the hash-based signature signal booster circuitry 108, the LSH obtainment circuitry 204, the hash element counter circuitry 206, the hash element preservation circuitry 208, the feature vector encoder circuitry 210, the cluster production circuitry 212, the element occurrence determination circuitry 216, the LSH grouping circuitry 218, the hash criteria determination circuitry 220, the anchor candidate list management circuitry 222, the resemblance computing circuitry 224, the resemblance sorting circuitry 226, and the resemblance incorporation circuitry 228.

The processor circuitry 912 of the illustrated example includes a local memory 913 (e.g., a cache, registers, etc.). The processor circuitry 912 of the illustrated example is in communication with a main memory including a volatile memory 914 and a non-volatile memory 916 by a bus 918. The volatile memory 914 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 916 may be implemented by flash memory and/or any other desired type of memory device. Access to the main memory 914, 916 of the illustrated example is controlled by a memory controller 917.

The processor platform 900 of the illustrated example also includes interface circuitry 920. The interface circuitry 920 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 922 are connected to the interface circuitry 920. The input device(s) 922 permit(s) a user to enter data and/or commands into the processor circuitry 912. The input device(s) 922 can be implemented by, for example, an audio sensor, a microphone, a camera (still or video), a keyboard, a button, a mouse, a touchscreen, a track-pad, a trackball, an isopoint device, and/or a voice recognition system.

One or more output devices 924 are also connected to the interface circuitry 920 of the illustrated example. The output device(s) 924 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 920 of the illustrated example, thus, typically includes a graphics driver card, a graphics driver chip, and/or graphics processor circuitry such as a GPU.

The interface circuitry 920 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 926. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 900 of the illustrated example also includes one or more mass storage devices 928 to store software and/or data. Examples of such mass storage devices 928 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 932, which may be implemented by the machine readable instructions of FIGS. 4-8, may be stored in the mass storage device 928, in the volatile memory 914, in the non-volatile memory 916, and/or on a removable non-transitory computer readable storage medium such as a CD or DVD.

Figure 10:
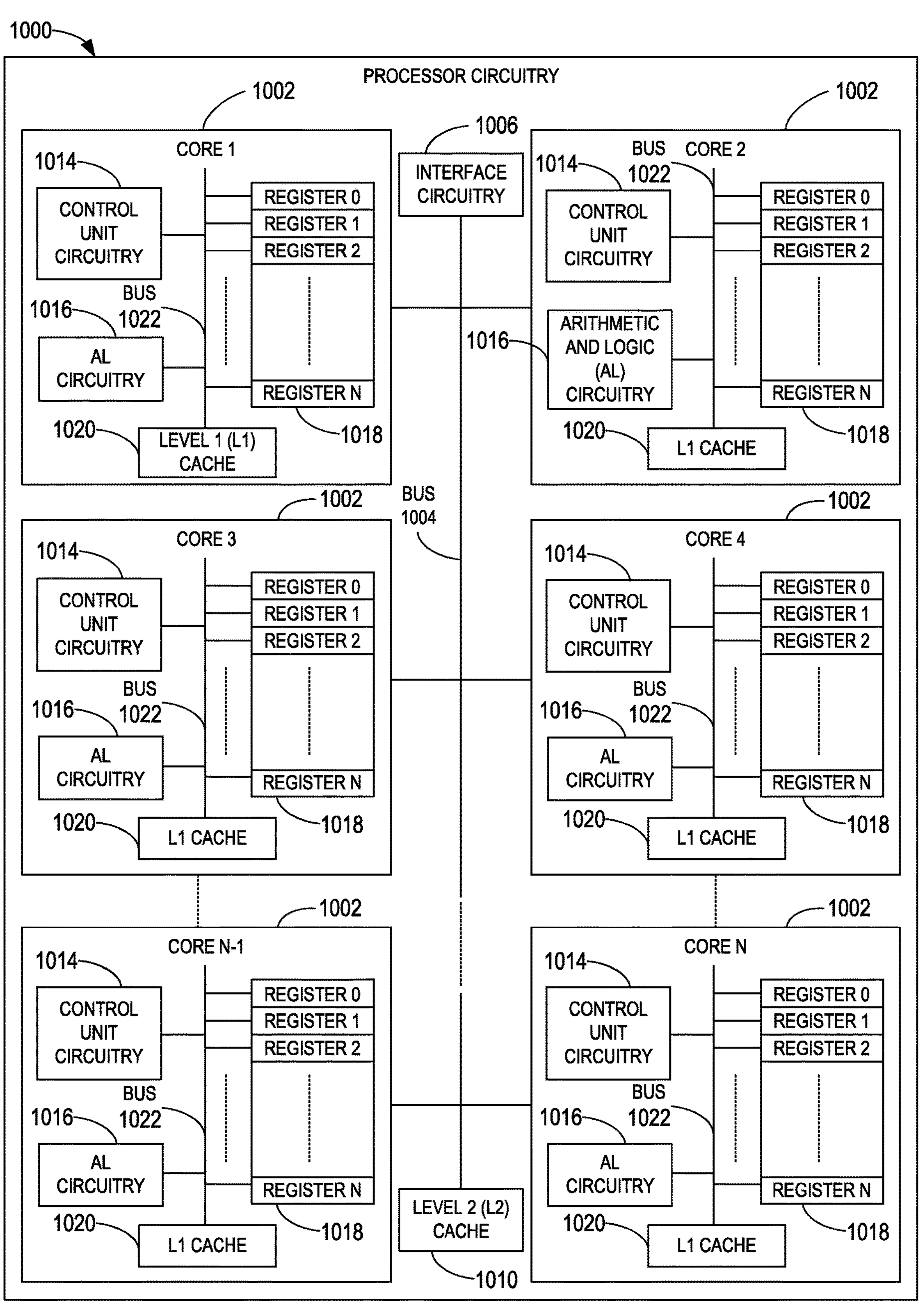
FIG. 10 is a block diagram of an example implementation of the processor circuitry of FIG. 9.

FIG. 10 is a block diagram of an example implementation of the processor circuitry 912 of FIG. 9. In this example, the processor circuitry 912 of FIG. 9 is implemented by a microprocessor 1000. For example, the microprocessor 1000 may be a general purpose microprocessor (e.g., general purpose microprocessor circuitry). The microprocessor 1000 executes some or all of the machine readable instructions of the flowcharts of FIGS. 4-8 to effectively instantiate the circuitry of FIG. 2 as logic circuits to perform the operations corresponding to those machine readable instructions. In some such examples, the circuitry of FIG. 2 is instantiated by the hardware circuits of the microprocessor 1000 in combination with the instructions. For example, the microprocessor 1000 may be implemented by multi-core hardware circuitry such as a CPU, a DSP, a GPU, an XPU, etc. Although it may include any number of example cores 1002 (e.g., 1 core), the microprocessor 1000 of this example is a multi-core semiconductor device including N cores. The cores 1002 of the microprocessor 1000 may operate independently or may cooperate to execute machine readable instructions. For example, machine code corresponding to a firmware program, an embedded software program, or a software program may be executed by one of the cores 1002 or may be executed by multiple ones of the cores 1002 at the same or different times. In some examples, the machine code corresponding to the firmware program, the embedded software program, or the software program is split into threads and executed in parallel by two or more of the cores 1002. The software program may correspond to a portion or all of the machine readable instructions and/or operations represented by the flowcharts of FIGS. 4-8.

The cores 1002 may communicate by a first example bus 1004. In some examples, the first bus 1004 may be implemented by a communication bus to effectuate communication associated with one(s) of the cores 1002. For example, the first bus 1004 may be implemented by at least one of an Inter-Integrated Circuit (I2C) bus, a Serial Peripheral Interface (SPI) bus, a PCI bus, or a PCIe bus. Additionally or alternatively, the first bus 1004 may be implemented by any other type of computing or electrical bus. The cores 1002 may obtain data, instructions, and/or signals from one or more external devices by example interface circuitry 1006. The cores 1002 may output data, instructions, and/or signals to the one or more external devices by the interface circuitry 1006. Although the cores 1002 of this example include example local memory 1020 (e.g., Level 1 (L1) cache that may be split into an L1 data cache and an L1 instruction cache), the microprocessor 1000 also includes example shared memory 1010 that may be shared by the cores (e.g., Level 2 (L2 cache)) for high-speed access to data and/or instructions. Data and/or instructions may be transferred (e.g., shared) by writing to and/or reading from the shared memory 1010. The local memory 1020 of each of the cores 1002 and the shared memory 1010 may be part of a hierarchy of storage devices including multiple levels of cache memory and the main memory (e.g., the main memory 914, 916 of FIG. 9). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1002 may be referred to as a CPU, DSP, GPU, etc., or any other type of hardware circuitry. Each core 1002 includes control unit circuitry 1014, arithmetic and logic (AL) circuitry (sometimes referred to as an ALU) 1016, a plurality of registers 1018, the local memory 1020, and a second example bus 1022. Other structures may be present. For example, each core 1002 may include vector unit circuitry, single instruction multiple data (SIMD) unit circuitry, load/store unit (LSU) circuitry, branch/jump unit circuitry, floating-point unit (FPU) circuitry, etc. The control unit circuitry 1014 includes semiconductor-based circuits structured to control (e.g., coordinate) data movement within the corresponding core 1002. The AL circuitry 1016 includes semiconductor-based circuits structured to perform one or more mathematic and/or logic operations on the data within the corresponding core 1002. The AL circuitry 1016 of some examples performs integer based operations. In other examples, the AL circuitry 1016 also performs floating point operations. In yet other examples, the AL circuitry 1016 may include first AL circuitry that performs integer based operations and second AL circuitry that performs floating point operations. In some examples, the AL circuitry 1016 may be referred to as an Arithmetic Logic Unit (ALU). The registers 1018 are semiconductor-based structures to store data and/or instructions such as results of one or more of the operations performed by the AL circuitry 1016 of the corresponding core 1002. For example, the registers 1018 may include vector register(s), SIMD register(s), general purpose register(s), flag register(s), segment register(s), machine specific register(s), instruction pointer register(s), control register(s), debug register(s), memory management register(s), machine check register(s), etc. The registers 1018 may be arranged in a bank as shown in FIG. 10. Alternatively, the registers 1018 may be organized in any other arrangement, format, or structure including distributed throughout the core 1002 to shorten access time. The second bus 1022 may be implemented by at least one of an I2C bus, a SPI bus, a PCI bus, or a PCIe bus Each core 1002 and/or, more generally, the microprocessor 1000 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1000 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

FIG. 6 is a block diagram of another example implementation of the processor circuitry 912 of FIG. 9. In this example, the processor circuitry 912 is implemented by FPGA circuitry 1100. For example, the FPGA circuitry 1100 may be implemented by an FPGA. The FPGA circuitry 1100 can be used, for example, to perform operations that could otherwise be performed by the example microprocessor 1000 of FIG. 10 executing corresponding machine readable instructions. However, once configured, the FPGA circuitry 1100 instantiates the machine readable instructions in hardware and, thus, can often execute the operations faster than they could be performed by a general purpose microprocessor executing the corresponding software.

Figure 11:
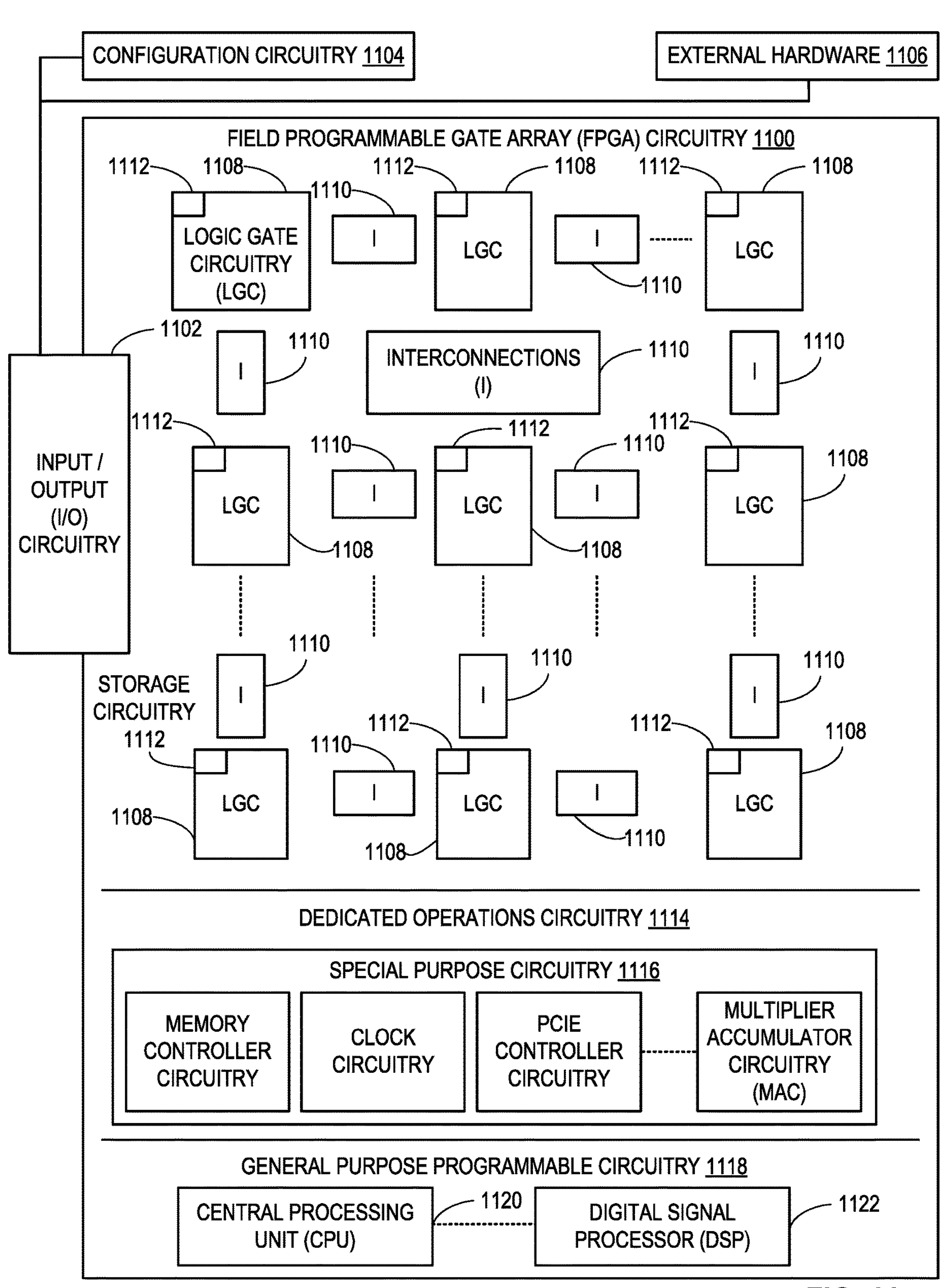
FIG. 11 is a block diagram of another example implementation of the processor circuitry of FIG. 9.

More specifically, in contrast to the microprocessor 1000 of FIG. 10 described above (which is a general purpose device that may be programmed to execute some or all of the machine readable instructions represented by the flowcharts of FIGS. 4-8 but whose interconnections and logic circuitry are fixed once fabricated), the FPGA circuitry 1100 of the example of FIG. 11 includes interconnections and logic circuitry that may be configured and/or interconnected in different ways after fabrication to instantiate, for example, some or all of the machine readable instructions represented by the flowcharts of FIGS. 4-8. In particular, the FPGA circuitry 1100 may be thought of as an array of logic gates, interconnections, and switches. The switches can be programmed to change how the logic gates are interconnected by the interconnections, effectively forming one or more dedicated logic circuits (unless and until the FPGA circuitry 1100 is reprogrammed). The configured logic circuits enable the logic gates to cooperate in different ways to perform different operations on data received by input circuitry. Those operations may correspond to some or all of the software represented by the flowcharts of FIGS. 4-8. As such, the FPGA circuitry 1100 may be structured to effectively instantiate some or all of the machine readable instructions of the flowcharts of FIGS. 4-8 as dedicated logic circuits to perform the operations corresponding to those software instructions in a dedicated manner analogous to an ASIC. Therefore, the FPGA circuitry 1100 may perform the operations corresponding to the some or all of the machine readable instructions of FIGS. 4-8 faster than the general purpose microprocessor can execute the same.

In the example of FIG. 11, the FPGA circuitry 1100 is structured to be programmed (and/or reprogrammed one or more times) by an end user by a hardware description language (HDL) such as Verilog. The FPGA circuitry 1100 of FIG. 11, includes example input/output (I/O) circuitry 1102 to obtain and/or output data to/from example configuration circuitry 1104 and/or external hardware 1106. For example, the configuration circuitry 1104 may be implemented by interface circuitry that may obtain machine readable instructions to configure the FPGA circuitry 1100, or portion(s) thereof. In some such examples, the configuration circuitry 1104 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1106 may be implemented by external hardware circuitry. For example, the external hardware 1106 may be implemented by the microprocessor 1000 of FIG. 10. The FPGA circuitry 1100 also includes an array of example logic gate circuitry 1108, a plurality of example configurable interconnections 1110, and example storage circuitry 1112. The logic gate circuitry 1108 and the configurable interconnections 1110 are configurable to instantiate one or more operations that may correspond to at least some of the machine readable instructions of FIGS. 4-8 and/or other desired operations. The logic gate circuitry 1108 shown in FIG. 11 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1108 to enable configuration of the electrical structures and/or the logic gates to form circuits to perform desired operations. The logic gate circuitry 1108 may include other electrical structures such as look-up tables (LUTs), registers (e.g., flip-flops or latches), multiplexers, etc.

The configurable interconnections 1110 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1108 to program desired logic circuits.

The storage circuitry 1112 of the illustrated example is structured to store result(s) of the one or more of the operations performed by corresponding logic gates. The storage circuitry 1112 may be implemented by registers or the like. In the illustrated example, the storage circuitry 1112 is distributed amongst the logic gate circuitry 1108 to facilitate access and increase execution speed.

The example FPGA circuitry 1100 of FIG. Y also includes example Dedicated Operations Circuitry 1114. In this example, the Dedicated Operations Circuitry 1114 includes special purpose circuitry 1116 that may be invoked to implement commonly used functions to avoid the need to program those functions in the field. Examples of such special purpose circuitry 1116 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1100 may also include example general purpose programmable circuitry 1118 such as an example CPU 1120 and/or an example DSP 1122. Other general purpose programmable circuitry 1118 may additionally or alternatively be present such as a GPU, an XPU, etc., that can be programmed to perform other operations.

Although FIGS. 10 and 11 illustrate two example implementations of the processor circuitry 912 of FIG. 9, many other approaches are contemplated. For example, as mentioned above, modern FPGA circuitry may include an on-board CPU, such as one or more of the example CPU 1120 of FIG. 11. Therefore, the processor circuitry 912 of FIG. 9 may additionally be implemented by combining the example microprocessor 1000 of FIG. 10 and the example FPGA circuitry 1100 of FIG. 11. In some such hybrid examples, a first portion of the machine readable instructions represented by the flowcharts of FIGS. 4-8 may be executed by one or more of the cores 1002 of FIG. 10, a second portion of the machine readable instructions represented by the flowcharts of FIGS. 4-8 may be executed by the FPGA circuitry 1100 of FIG. 11, and/or a third portion of the machine readable instructions represented by the flowcharts of FIGS. 4-8 may be executed by an ASIC. It should be understood that some or all of the circuitry of FIG. 2 may, thus, be instantiated at the same or different times. Some or all of the circuitry may be instantiated, for example, in one or more threads executing concurrently and/or in series. Moreover, in some examples, some or all of the circuitry of FIG. 2 may be implemented within one or more virtual machines and/or containers executing on the microprocessor.

In some examples, the processor circuitry 912 of FIG. 9 may be in one or more packages. For example, the microprocessor 1000 of FIG. 10 and/or the FPGA circuitry 1100 of FIG. 11 may be in one or more packages. In some examples, an XPU may be implemented by the processor circuitry 912 of FIG. 9, which may be in one or more packages. For example, the XPU may include a CPU in one package, a DSP in another package, a GPU in yet another package, and an FPGA in still yet another package.

Figure 12:
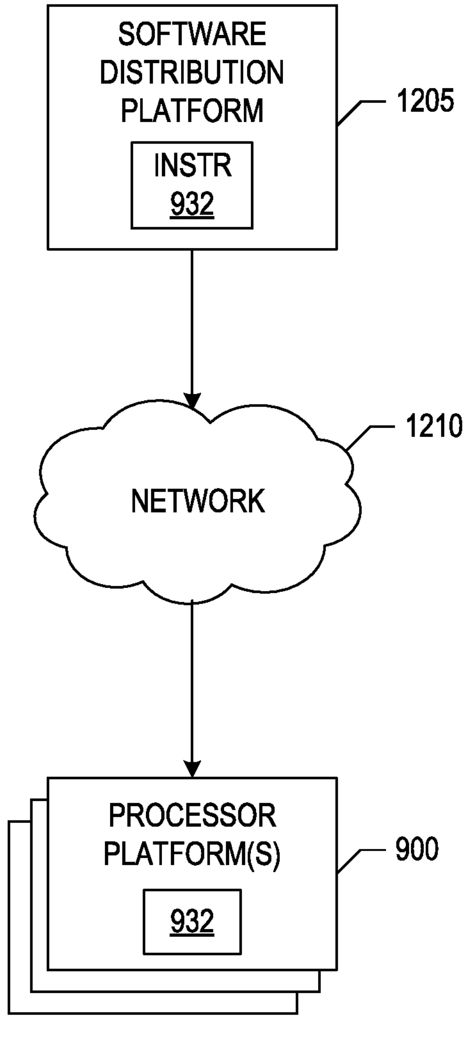
FIG. 12 is a block diagram of an example software distribution platform (e.g., one or more servers) to distribute software (e.g., software corresponding to the example machine readable instructions of FIGS. 4-8) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1205 to distribute software such as the example machine readable instructions 932 of FIG. 9 to hardware devices owned and/or operated by third parties is illustrated in FIG. 12. The example software distribution platform 1205 may be implemented by any computer server, data facility, cloud service, etc., capable of storing and transmitting software to other computing devices. The third parties may be customers of the entity owning and/or operating the software distribution platform 1205. For example, the entity that owns and/or operates the software distribution platform 1205 may be a developer, a seller, and/or a licensor of software such as the example machine readable instructions 932 of FIG. 9. The third parties may be consumers, users, retailers, OEMs, etc., who purchase and/or license the software for use and/or re-sale and/or sub-licensing. In the illustrated example, the software distribution platform 1205 includes one or more servers and one or more storage devices. The storage devices store the machine readable instructions 932, which may correspond to the example machine readable instructions and/or operations 400, 800, etc. of FIGS. 4-8, as described above. The one or more servers of the example software distribution platform 1205 are in communication with an example network 1210, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 932 from the software distribution platform 1205. For example, the software, which may correspond to the example machine readable instructions and/or operations 400, 800, etc. of FIGS. 4-8, may be downloaded to the example processor platform 900, which is to execute the machine readable instructions 932 to implement the hash-based signature signal booster circuitry 108 of FIGS. 1 and 2. In some examples, one or more servers of the software distribution platform 1205 periodically offer, transmit, and/or force updates to the software (e.g., the example machine readable instructions 932 of FIG. 9) to ensure improvements, patches, updates, etc., are distributed and applied to the software at the end user devices.

From the foregoing, it will be appreciated that example systems, methods, apparatus, and articles of manufacture have been disclosed to translate hash-based signature signals for machine learning applications. Disclosed systems, methods, apparatus, and articles of manufacture improve the efficiency of using a computing device by making hash-based signatures/fingerprints flexible enough to be resilient against perturbations while at the same time enabling machine learning solutions to capitalize on the boosted signal of features derived from hash-based signatures/fingerprints. Disclosed systems, methods, apparatus, and articles of manufacture are accordingly directed to one or more improvement(s) in the operation of a machine such as a computer or other electronic and/or mechanical device.

Further examples and combinations thereof include the following:

Example 1 includes an apparatus comprising interface circuitry to communicatively couple a processor circuitry and a memory, and the processor circuitry including one or more of at least one of a central processor unit, a graphics processor unit, or a digital signal processor, the at least one of the central processor unit, the graphics processor unit, or the digital signal processor having control circuitry to control data movement within the processor circuitry, arithmetic and logic circuitry to perform one or more first operations corresponding to instructions, and one or more registers to store a result of the one or more first operations, the instructions in the apparatus, a Field Programmable Gate Array (FPGA), the FPGA including logic gate circuitry, a plurality of configurable interconnections, and storage circuitry, the logic gate circuitry and the plurality of the configurable interconnections to perform one or more second operations, the storage circuitry to store a result of the one or more second operations, or Application Specific Integrated Circuitry (ASIC) including logic gate circuitry to perform one or more third operations, the processor circuitry to perform at least one of the first operations, the second operations, or the third operations to instantiate hash element counter circuitry to determine an element count for a plurality of hash elements of a locality sensitivity hash, hash element preservation circuitry to preserve ones of hash elements of the plurality of hash elements that satisfy an element count threshold, cluster production circuitry to produce a cluster of encoded feature vectors of the preserved ones of the hash elements, element occurrence determination circuitry to determine an occurrence frequency of hash elements in the cluster, and synthetic hash creation circuitry to create a synthetic hash of the cluster based on a subset of the hash elements in the cluster that satisfy an occurrence frequency threshold.

Example 2 includes the apparatus of example 1, wherein the locality sensitive hash is one of a plurality of locality sensitive hashes, and wherein the processor circuitry to perform at least one of the first operations, the second operations, or the third operations to instantiate locality sensitive hash obtainment circuitry to obtain the plurality of locality sensitive hashes corresponding to sections in a plurality of training samples, the plurality of training samples in a training dataset, wherein ones of the plurality of locality sensitive hashes include a plurality of hash elements.

Example 3 includes the apparatus of example 2, wherein the processor circuitry to perform at least one of the first operations, the second operations, or the third operations to instantiate resemblance computing circuitry to compute a plurality of resemblances between each of the plurality of locality sensitivity hashes and the synthetic hash, each of the plurality of resemblances corresponding to a list of features, resemblance sorting circuitry to sort the plurality of resemblances based on similarity value, and resemblance incorporation circuitry to incorporate one or more resemblances of the plurality of resemblances into a feature set for the training dataset of samples, wherein the one or more resemblances of the plurality of resemblances satisfy a similarity value threshold.

Example 4 includes the apparatus of example 3, wherein the plurality of resemblances is a first plurality of a resemblances, wherein the list of features is a first list of features, wherein the feature set is a first feature set, and wherein the processor circuitry to perform at least one of the first operations, the second operations, or the third operations to instantiate the resemblance computing circuitry to compute, using at least the first feature set, a second plurality of resemblances between the plurality of locality sensitivity hashes and the synthetic hash, the second plurality of resemblances corresponding to a second list of features, the resemblance sorting circuitry to sort the second plurality of resemblances based on similarity value, and resemblance incorporation circuitry to incorporate one or more resemblances of the second plurality of resemblances into a second feature set for a testing dataset of samples, wherein the one or more resemblances of the second plurality of resemblances satisfy the similarity value threshold.

Example 5 includes the apparatus of example 3, wherein to compute a plurality of resemblances between the plurality of locality sensitivity hashes and the synthetic hash further includes the processor circuitry to perform at least one of the first operations, the second operations, or the third operations to instantiate the resemblance computing circuitry to compute a Jaccard distance between the plurality of locality sensitivity hashes and the synthetic hash.

Example 6 includes the apparatus of example 5, wherein to obtain a plurality of locality sensitivity hashes further includes the processor circuitry to perform at least one of the first operations, the second operations, or the third operations to instantiate the locality sensitive hash obtainment circuitry to compute a MinHash for ones of the corresponding section of the plurality of training samples.

Example 7 includes the apparatus of example 6, wherein to determine an occurrence frequency of the ones of the plurality of hash elements in the at least one cluster further includes the processor circuitry to perform at least one of the first operations, the second operations, or the third operations to instantiate the element occurrence determination circuitry to determine one of a mode or a weighted mode of the ones of the plurality of hash elements in the at least one cluster.

Example 8 includes the apparatus of example 1, wherein the processor circuitry to perform at least one of the first operations, the second operations, or the third operations to instantiate feature vector encoder circuitry to encode the feature vectors with the preserved ones of hash elements.

Example 9 includes a non-transitory machine readable storage medium comprising instructions that, when executed, cause processor circuitry to at least determine an element count for a plurality of hash elements of a locality sensitivity hash, preserve ones of hash elements of the plurality of hash elements that satisfy an element count threshold, produce a cluster of encoded feature vectors of the preserved ones of the hash elements, determine an occurrence frequency of hash elements in the cluster, and create a synthetic hash of the cluster based on a subset of the hash elements in the cluster that satisfy an occurrence frequency threshold.

Example 10 includes the non-transitory machine readable storage medium of example 9, wherein the locality sensitive hash is one of a plurality of locality sensitive hashes, including instructions that, when executed, cause processor circuitry to at least obtain the plurality of locality sensitive hashes corresponding to sections in a plurality of training samples, the plurality of training samples in a training dataset, wherein ones of the plurality of locality sensitive hashes include a plurality of hash elements.

Example 11 includes the non-transitory machine readable storage medium of example 10, including instructions that, when executed, cause processor circuitry to at least compute a plurality of resemblances between each of the plurality of locality sensitivity hashes and the synthetic hash, each of the plurality of resemblances corresponding to a list of features, sort the plurality of resemblances based on similarity value, and incorporate one or more resemblances of the plurality of resemblances into a feature set for the training dataset of samples, wherein the one or more resemblances of the plurality of resemblances satisfy a similarity value threshold.

Example 12 includes the non-transitory machine readable storage medium of example 11, wherein the plurality of resemblances is a first plurality of a resemblances, wherein the list of features is a first list of features, wherein the feature set is a first feature set, including instructions that, when executed, cause processor circuitry to at least compute, using at least the first feature set, a second plurality of resemblances between the plurality of locality sensitivity hashes and the synthetic hash, the second plurality of resemblances corresponding to a second list of features, sort the second plurality of resemblances based on similarity value, and incorporate one or more resemblances of the second plurality of resemblances into a second feature set for a testing dataset of samples, wherein the one or more resemblances of the second plurality of resemblances satisfy the similarity value threshold.

Example 13 includes the non-transitory machine readable storage medium of example 11, including instructions that, when executed, cause processor circuitry to at least compute a Jaccard distance between the plurality of locality sensitivity hashes and the synthetic hash.

Example 14 includes the non-transitory machine readable storage medium of example 13, including instructions that, when executed, cause processor circuitry to at least compute a MinHash for ones of the corresponding section of the plurality of training samples.

Example 15 includes the non-transitory machine readable storage medium of example 14, including instructions that, when executed, cause processor circuitry to at least determine one of a mode or a weighted mode of the ones of the plurality of hash elements in the at least one cluster.

Example 16 includes the non-transitory machine readable storage medium of example 9, including instructions that, when executed, cause processor circuitry to at least encode the feature vectors with the preserved ones of hash elements.

Example 17 includes an apparatus comprising at least one memory, machine readable instructions, and processor circuitry to at least one of instantiate or execute the machine readable instructions to group ones of a plurality of locality sensitive hashes that are equal into a first locality sensitive hash group, the first locality sensitive hash group corresponding to a first locality sensitive hash of the plurality of locality sensitive hashes, add the first locality sensitive hash to a list of anchor candidates in response to the first locality sensitive hash satisfying at least one hash criteria, compute a plurality of resemblances of the locality sensitivity hash to a plurality of anchor candidates in the list of anchor candidates, sort the plurality of resemblances based on similarity value, and incorporate a first resemblance of the plurality of resemblances into a feature set for a training dataset of samples, wherein the first resemblance satisfies a similarity value threshold. (incorporate a group of one or more resemblances of the plurality of resemblances into a feature set for the training dataset of samples, wherein the one or more resemblances satisfies a similarity value threshold.) example 18 includes the apparatus of example 17, including the processor circuitry to at least one of instantiate or execute the machine readable instructions to obtain the plurality of locality sensitive hashes from the training dataset of samples.

Example 19 includes the apparatus of example 18, including the processor circuitry to at least one of instantiate or execute the machine readable instructions to compute a MinHash for ones of corresponding sections of the plurality of the training dataset of samples.

Example 20 includes the apparatus of example 17, wherein the plurality of resemblances is a first plurality of a resemblances, the feature set is a first feature set, including the processor circuitry to at least one of instantiate or execute the machine readable instructions to compute, using the first feature set, a second plurality of resemblances between the plurality of locality sensitive hashes and the at least one hash criteria, sort the second plurality of resemblances based on similarity value, and incorporate a second resemblance that satisfies the similarity value threshold into a second feature set for a testing dataset.

Example 21 includes the apparatus of example 17, including the processor circuitry to at least one of instantiate or execute the machine readable instructions to compute a Jaccard distance between the plurality of locality sensitivity hashes and the plurality of anchor candidates in the list of anchor candidates.

Example 22 includes the apparatus of example 17, wherein the at least one hash criteria includes at least one of a minimum group maliciousness percentage or a minimum group sample threshold.

Example 23 includes a non-transitory machine readable storage medium comprising instructions that, when executed, cause processor circuitry to at least obtain a plurality of locality sensitive hashes from a training dataset of samples, group ones of a plurality of locality sensitive hashes that are equal into a first locality sensitive hash group, the first locality sensitive hash group corresponding to a first locality sensitive hash of the plurality of locality sensitive hashes, add the first locality sensitive hash to a list of anchor candidates in response to the first locality sensitive hash satisfying at least one hash criteria, compute a plurality of resemblances of the locality sensitivity hash to a plurality of anchor candidates in the list of anchor candidates, sort the plurality of resemblances based on similarity value, and incorporate a first resemblance of the plurality of resemblances into a feature set for the training dataset of samples, wherein the first resemblance satisfies a similarity value threshold.

Example 24 includes the non-transitory machine readable storage medium of example 18, including instructions that, when executed, cause processor circuitry to at least compute a MinHash for ones of corresponding sections of the plurality of the training dataset of samples.

Example 25 includes the non-transitory machine readable storage medium of example 17, wherein the plurality of resemblances is a first plurality of a resemblances, the feature set is a first feature set, including instructions that, when executed, cause processor circuitry to at least compute, using the first feature set, a second plurality of resemblances between the plurality of locality sensitive hashes and the at least one hash criteria, sort the second plurality of resemblances based on similarity value, and incorporate a second resemblance that satisfies the similarity value threshold into a second feature set for a testing dataset.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:

interface circuitry to communicatively couple a processor circuitry and a memory;

computer readable instructions; and programmable circuitry to instantiate:

hash element counter circuitry to determine an element count for a plurality of hash elements of a locality sensitivity hash;

hash element preservation circuitry to preserve ones of hash elements of the plurality of hash elements that satisfy an element count threshold;

feature vector encoder circuitry to compare a hash element of the plurality of hash elements to the preserved ones of the hash elements and to encode at least one feature vector including the hash element at a location of the hash element based on the hash element being one of the preserved ones of the hash elements;

cluster production circuitry to produce a cluster of encoded feature vectors based on the at least one feature vector;

element occurrence determination circuitry to determine an occurrence frequency of hash elements in the cluster; and synthetic hash creation circuitry to create a synthetic hash of the cluster based on a subset of the hash elements in the cluster that satisfy an occurrence frequency threshold, wherein the synthetic hash includes a hash element for a group of similar hash elements that satisfy the occurrence frequency threshold, the synthetic hash to represent relevant features of the plurality of hash elements.

2. The apparatus of claim 1, wherein the locality sensitive hash is one of a plurality of locality sensitive hashes, and wherein the programmable circuitry is to instantiate locality sensitive hash obtainment circuitry to obtain the plurality of locality sensitive hashes corresponding to sections in a plurality of training samples, the plurality of training samples in a training dataset, wherein ones of the plurality of locality sensitive hashes include a plurality of hash elements.

3. The apparatus of claim 2, wherein the programmable circuitry is to instantiate:

resemblance computing circuitry to compute a plurality of resemblances between each of the plurality of locality sensitivity hashes and the synthetic hash, each of the plurality of resemblances corresponding to a list of features;

resemblance sorting circuitry to sort the plurality of resemblances based on similarity value; and resemblance incorporation circuitry to incorporate one or more resemblances of the plurality of resemblances into a feature set for the training dataset of samples, wherein the one or more resemblances of the plurality of resemblances satisfy a similarity value threshold.

4. The apparatus of claim 3, wherein the plurality of resemblances is a first plurality of a resemblances, wherein the list of features is a first list of features, wherein the feature set is a first feature set, and wherein the programmable circuitry is to instantiate:

the resemblance computing circuitry to compute, using at least the first feature set, a second plurality of resemblances between the plurality of locality sensitivity hashes and the synthetic hash, the second plurality of resemblances corresponding to a second list of features;

the resemblance sorting circuitry to sort the second plurality of resemblances based on similarity value; and resemblance incorporation circuitry to incorporate one or more resemblances of the second plurality of resemblances into a second feature set for a testing dataset of samples, wherein the one or more resemblances of the second plurality of resemblances satisfy the similarity value threshold.

5. The apparatus of claim 3, wherein to compute a plurality of resemblances between the plurality of locality sensitivity hashes and the synthetic hash further includes the programmable circuitry is to instantiate the resemblance computing circuitry to compute a Jaccard distance between the plurality of locality sensitivity hashes and the synthetic hash.

6. The apparatus of claim 5, wherein to obtain a plurality of locality sensitivity hashes further includes the programmable circuitry is to instantiate the locality sensitive hash obtainment circuitry to compute a MinHash for ones of the corresponding section of the plurality of training samples.

7. The apparatus of claim 6, wherein to determine an occurrence frequency of the ones of the plurality of hash elements in the cluster further includes the programmable circuitry is to instantiate the element occurrence determination circuitry to determine one of a mode or a weighted mode of the ones of the plurality of hash elements in the cluster.

8. A non-transitory machine readable storage medium comprising instructions that, when executed, cause processor circuitry to at least:

- determine an element count for a plurality of hash elements of a locality sensitivity hash;
- preserve ones of hash elements of the plurality of hash elements that satisfy an element count threshold;
- compare a hash element of the plurality of hash elements to the preserved ones of the hash elements;
- encode at least one feature vector including the hash element at a location of the hash element based on the hash element being one of the preserved ones of the hash elements;
- produce a cluster of encoded feature vectors based on the at least one feature vector;
- determine an occurrence frequency of hash elements in the cluster; and
- create a synthetic hash of the cluster based on a subset of the hash elements in the cluster that satisfy an occurrence frequency threshold, wherein the synthetic hash includes a hash element for a group of similar hash elements that satisfy the occurrence frequency threshold, the synthetic hash to represent relevant features of the plurality of hash elements.

9. The non-transitory machine readable storage medium of claim 8, wherein the locality sensitive hash is one of a plurality of locality sensitive hashes, including instructions that, when executed, cause processor circuitry to at least obtain the plurality of locality sensitive hashes corresponding to sections in a plurality of training samples, the plurality of training samples in a training dataset, wherein ones of the plurality of locality sensitive hashes include a plurality of hash elements.

10. The non-transitory machine readable storage medium of claim 9, including instructions that, when executed, cause processor circuitry to at least:

- compute a plurality of resemblances between each of the plurality of locality sensitivity hashes and the synthetic hash, each of the plurality of resemblances corresponding to a list of features;
- sort the plurality of resemblances based on similarity value; and
- incorporate one or more resemblances of the plurality of resemblances into a feature set for the training dataset of samples, wherein the one or more resemblances of the plurality of resemblances satisfy a similarity value threshold.

11. The non-transitory machine readable storage medium of claim 10, wherein the plurality of resemblances is a first plurality of a resemblances, wherein the list of features is a first list of features, wherein the feature set is a first feature set, including instructions that, when executed, cause processor circuitry to at least:

- compute, using at least the first feature set, a second plurality of resemblances between the plurality of locality sensitivity hashes and the synthetic hash, the second plurality of resemblances corresponding to a second list of features;
- sort the second plurality of resemblances based on similarity value; and
- incorporate one or more resemblances of the second plurality of resemblances into a second feature set for a testing dataset of samples, wherein the one or more resemblances of the second plurality of resemblances satisfy the similarity value threshold.

12. The non-transitory machine readable storage medium of claim 10, including instructions that, when executed, cause processor circuitry to at least compute a Jaccard distance between the plurality of locality sensitivity hashes and the synthetic hash.

13. The non-transitory machine readable storage medium of claim 12, including instructions that, when executed, cause processor circuitry to at least compute a MinHash for ones of the corresponding section of the plurality of training samples.

14. The non-transitory machine readable storage medium of claim 13, including instructions that, when executed, cause processor circuitry to at least determine one of a mode or a weighted mode of the ones of the plurality of hash elements in the at least cluster.

15. An apparatus comprising:

- at least one memory;
- machine readable instructions; and
- processor circuitry to at least one of instantiate or execute the machine readable instructions to:
- group ones of a plurality of locality sensitive hashes that are equal into a first locality sensitive hash group, the first locality sensitive hash group corresponding to a first locality sensitive hash of the plurality of locality sensitive hashes;
- add the first locality sensitive hash to a list of anchor candidates in response to the first locality sensitive hash satisfying a minimum group maliciousness percentage, where the minimum group maliciousness percentage is based on a number of the ones of the plurality of locality sensitive hashes associated with a malicious origin;
- compute a plurality of resemblances of the locality sensitivity hash to a plurality of anchor candidates in the list of anchor candidates;
- sort the plurality of resemblances based on similarity value; and
- incorporate a first resemblance of the plurality of resemblances into a feature set for a training dataset of samples, wherein the first resemblance satisfies a similarity value threshold.

16. The apparatus of claim 15, including the processor circuitry to at least one of instantiate or execute the machine readable instructions to obtain the plurality of locality sensitive hashes from the training dataset of samples.

17. The apparatus of claim 16, including the processor circuitry to at least one of instantiate or execute the machine readable instructions to compute a MinHash for ones of corresponding sections of the plurality of the training dataset of samples.

18. The apparatus of claim 15, wherein the plurality of resemblances is a first plurality of a resemblances, the feature set is a first feature set, including the processor circuitry to at least one of instantiate or execute the machine readable instructions to:

compute, using the first feature set, a second plurality of resemblances between the plurality of locality sensitive hashes and the at least one of the minimum group maliciousness percentage or the minimum group sample threshold;

sort the second plurality of resemblances based on similarity value; and incorporate a second resemblance that satisfies the similarity value threshold into a second feature set for a testing dataset.

19. The apparatus of claim 15, including the processor circuitry to at least one of instantiate or execute the machine readable instructions to compute a Jaccard distance between the plurality of locality sensitivity hashes and the plurality of anchor candidates in the list of anchor candidates.

20. The apparatus of claim 15, wherein the processor circuitry is to add the first locality sensitive hash to the list of anchor candidates in response to the first locality sensitive hash satisfying both of the minimum group maliciousness percentage and the minimum group sample threshold.

21. A non-transitory machine readable storage medium comprising instructions that, when executed, cause processor circuitry to at least:

obtain a plurality of locality sensitive hashes from a training dataset of samples;

group ones of a plurality of locality sensitive hashes that are equal into a first locality sensitive hash group, the first locality sensitive hash group corresponding to a first locality sensitive hash of the plurality of locality sensitive hashes;

add the first locality sensitive hash to a list of anchor candidates in response to the first locality sensitive hash satisfying a minimum group maliciousness percentage, where the minimum group maliciousness percentage is based on a number of the ones of the plurality of locality sensitive hashes associated with a malicious origin;

compute a plurality of resemblances of the locality sensitivity hash to a plurality of anchor candidates in the list of anchor candidates;

sort the plurality of resemblances based on similarity value; and incorporate a first resemblance of the plurality of resemblances into a feature set for the training dataset of samples, wherein the first resemblance satisfies a similarity value threshold.

22. The non-transitory machine readable storage medium of claim 21, including instructions that, when executed, cause processor circuitry to at least compute a MinHash for ones of corresponding sections of the plurality of the training dataset of samples.

23. The non-transitory machine readable storage medium of claim 21, wherein the plurality of resemblances is a first plurality of a resemblances, the feature set is a first feature set, including instructions that, when executed, cause processor circuitry to at least:

compute, using the first feature set, a second plurality of resemblances between the plurality of locality sensitive hashes and the at least one of the minimum group maliciousness percentage or the minimum group sample threshold;

sort the second plurality of resemblances based on similarity value; and incorporate a second resemblance that satisfies the similarity value threshold into a second feature set for a testing dataset.

* * * * *